US011388455B2

(12) United States Patent
Chirokov et al.

(10) Patent No.: US 11,388,455 B2
(45) Date of Patent: *Jul. 12, 2022

(54) METHOD AND APPARATUS FOR MORPHING MULTIPLE VIDEO STREAMS INTO SINGLE VIDEO STREAM

(71) Applicant: MULTIMO, LLC, Orange Village, OH (US)

(72) Inventors: Valeri B. Chirokov, Orange Village, OH (US); Vladimir E. Koltunov, Saint-Petersburg (RU)

(73) Assignee: Multimo, LLC, Orange Village, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/618,726

(22) PCT Filed: Jun. 1, 2018

(86) PCT No.: PCT/US2018/035571
§ 371 (c)(1),
(2) Date: Dec. 2, 2019

(87) PCT Pub. No.: WO2018/222974
PCT Pub. Date: Dec. 6, 2018

(65) Prior Publication Data
US 2020/0169766 A1    May 28, 2020

Related U.S. Application Data

(63) Continuation-in-part of application No. PCT/US2017/035478, filed on Jun. 1, 2017, and a
(Continued)

(51) Int. Cl.
H04N 21/2365    (2011.01)
H04N 21/2343    (2011.01)
(Continued)

(52) U.S. Cl.
CPC ... *H04N 21/2365* (2013.01); *H04N 21/21805* (2013.01); *H04N 21/2343* (2013.01);
(Continued)

(58) Field of Classification Search
CPC .... H04N 19/103; H04N 19/119; H04N 19/12; H04N 19/124; H04N 19/162;
(Continued)

(56) References Cited

U.S. PATENT DOCUMENTS

2010/0050221 A1    2/2010    McCutchen et al.
2014/0059166 A1    2/2014    Mann et al.
(Continued)

FOREIGN PATENT DOCUMENTS

CN    101252687 A    8/2008
CN    101841694 A    9/2010
(Continued)

OTHER PUBLICATIONS

English Bibliography of French Patent Application No. 2927758A1, printed from Derwent Innovations on Nov. 25, 2019, 4 pages.
(Continued)

*Primary Examiner* — Rong Le
(74) *Attorney, Agent, or Firm* — Fay Sharpe LLP

(57) ABSTRACT

A method of morphing multiple video streams into a single video stream is provided. In one embodiment, the method includes receiving video streams at an encoding device, each multiple video stream is formed by video frames; encoding the video frames for each video stream at multiple bitrates to form multiple resolution qualities for each video stream; and combining streams for the multiple resolution qualities of the video streams to form a video bunch frame stream. An apparatus for morphing multiple video streams into a single video stream is also provided. A non-transitory computer-readable medium storing program instructions is also pro-
(Continued)

vided. When executed by a computer or processor, the program instructions cause the apparatus to perform the method.

21 Claims, 18 Drawing Sheets

Related U.S. Application Data continuation-in-part of application No. 16/306,065, filed as application No. PCT/US2017/035478 on Jun. 1, 2017, now Pat. No. 11,153,615.

(60) Provisional application No. 62/513,826, filed on Jun. 1, 2017, provisional application No. 62/344,543, filed on Jun. 2, 2016.

(51) Int. Cl.
*H04N 21/218* (2011.01)
*H04N 21/2662* (2011.01)
*H04N 21/81* (2011.01)
*H04N 21/231* (2011.01)

(52) U.S. Cl.
CPC ... *H04N 21/23106* (2013.01); *H04N 21/2662* (2013.01); *H04N 21/816* (2013.01)

(58) Field of Classification Search
CPC .............. H04N 19/172; H04N 19/179; H04N 21/234363; H04N 21/23439; H04N 21/2353; H04N 21/2365; H04N 21/4307; H04N 21/4728; H04N 21/85406; H04N 21/21805; H04N 21/23106; H04N 21/2343; H04N 21/2662; H04N 21/816; C07K 16/3069; C07K 2317/34; C12Q 1/6886; C12Q 2600/112; C12Q 2600/156; C12Q 2600/158; C12Q 2600/16; G01N 2800/60; G01N 33/57442
See application file for complete search history.

(56) References Cited

U.S. PATENT DOCUMENTS

| | | |
|---|---|---|
| 2014/0176479 A1* | 6/2014 | Wardenaar ......... H04N 21/4312 345/173 |
| 2014/0269936 A1 | 9/2014 | Shivadas et al. |
| 2015/0172545 A1 | 6/2015 | Szabo et al. |
| 2015/0199366 A1* | 7/2015 | Marlatt ................. G06F 3/0608 707/823 |
| 2015/0201197 A1* | 7/2015 | Marlatt ............. H04N 21/4307 375/240.03 |
| 2015/0237166 A1 | 8/2015 | Denoual et al. |
| 2017/0078447 A1 | 3/2017 | Hancock et al. |
| 2017/0237983 A1* | 8/2017 | Adsumilli ........ H04N 21/23439 375/240.03 |

FOREIGN PATENT DOCUMENTS

| | | |
|---|---|---|
| CN | 104735464 A | 6/2015 |
| CN | 104904225 A | 9/2015 |
| EP | 2555517 A1 | 2/2013 |
| EP | 2824884 A1 | 1/2015 |
| FR | 2927758 A1 | 8/2009 |

OTHER PUBLICATIONS

International Search Report for PCT Application No. PCT/US2018/035571, dated Aug. 8, 2018, 3 pages.
Written Opinion of the International Searching Authority for PCT Application No. PCT/US2018/035571, dated Aug. 8, 2018, 7 pages.
English Bibliography of Chinese Pat. App. Publication No. 101252687A, published Aug. 27, 2008, printed from Derwent Innovation on Nov. 10, 2021, 6 pages.
English Bibliography of Chinese Pat. App. Publication No. 104904225A, published Sep. 9, 2015, printed from Derwent Innovation on Nov. 10, 2021, 8 pages.
English Bibliography of Chinese Pat. App. Publication No. 101841694A, published on Sep. 22, 2010, printed from Derwent Innovation on Feb. 18, 2022, 6 pages.
English Bibliography of Chinese Pat. App. Publication No. 104735464A, published on Jun. 24, 2015, printed from Derwent Innovation on Feb. 18, 2022, 5 pages.

* cited by examiner

METHOD AND APPARATUS FOR MORPHING MULTIPLE VIDEO STREAMS INTO SINGLE VIDEO STREAM

CROSS-REFERENCE TO RELATED APPLICATIONS

This application claims priority to and the benefit of U.S. Provisional Patent Application Ser. No. 62/513,826, filed Jun. 1, 2017 and entitled METHOD AND APPARATUS FOR MORPHING MULTIPLE VIDEO STREAMS INTO A SINGLE VIEW. This application is a continuation-in-part of International Patent Application No. PCT/US2017/035478, filed Jun. 1, 2017, which claims priority to U.S. Provisional Patent Application Ser. No. 62/344,543, filed Jun. 2, 2016. The contents of these three applications are fully incorporated herein by reference.

FIELD OF THE INVENTION

This disclosure relates to providing multiple views from multiple video streams in a single view based on a multi-view video stream. Various embodiments of methods, processes, and systems for capturing or uploading, encoding, and streaming monoscopic and stereoscopic multiple video streams morphed into single view for presentation. In one embodiment, the methods, processes, and systems can comprise live capturing or receiving a plurality of monoscopic or stereoscopic video frame feeds; encoding and converting frame streams into video bunch streams or files, consisting of a plurality video frames in a plurality of resolution qualities; and streaming bunch frames to a viewer client device as determined by request from a viewer client device.

BACKGROUND

Video content includes video and audio data. Video content from multiple sources may reflect different views of the same area of interest or different areas of interest. A consumer of video content from multiple sources may desire to select a view from multiple views and/or an area of interest from multiple areas of interest. The displayed video content shifts in response to the viewer selecting a desired view and/or selecting a desired area of interest. Current systems may require specialized equipment to enable the desired experience from multiple video sources. Such specialized equipment may include extensive, redundant hardware and/or specialized video processors.

It would be desirable therefore to provide apparatus and methods for combining video content from multiple sources in a manner that provides a viewer with the ability to easily select between content views. It would further be desirable to provide efficient, standardized processing of video content from multiple sources to enable selecting and switching between content views seamlessly and transitioning between content views smoothly.

SUMMARY

In various embodiments, the methods, processes, and systems can comprise live capturing or receiving of a plurality of monoscopic or stereoscopic video frame feeds; encoding and converting the frame streams into video bunch frame streams or files, each video bunch frame stream including a plurality of video frames in a plurality of resolution qualities represented quantitatively in the form of a bitrate; and streaming bunch frames to a viewer client device as determined by a request from the viewer client device.

In one aspect, a method of morphing multiple video streams into a single video stream is provided. In one embodiment, the method includes: receiving multiple video streams at an encoding device, wherein each multiple video stream is formed by a plurality of video frames, wherein the multiple video streams are configured such that each multiple video stream provides a different content view than other streams of the multiple video streams; encoding the plurality of video frames for each multiple video stream at multiple bitrates to form multiple resolution qualities for each multiple video stream, wherein the multiple resolution qualities range from a highest resolution quality to a lowest resolution quality; and combining streams for the multiple resolution qualities of the multiple video streams to form a video bunch frame stream.

In another aspect, an apparatus for morphing multiple video streams into a single video stream is provided. In one embodiment, the apparatus includes: an encoding device configured to receive multiple video streams, wherein each multiple video stream is formed by a plurality of video frames, wherein the multiple video streams are configured such that each multiple video stream provides a different content view than other streams of the multiple video streams; wherein the encoding device is configured to encode the plurality of video frames for each multiple video stream at multiple bitrates to form multiple resolution qualities for each multiple video stream, wherein the multiple resolution qualities range from a highest resolution quality to a lowest resolution quality; wherein the encoding device is configured to combine streams for the multiple resolution qualities of the multiple video streams to form a video bunch frame stream.

In yet another aspect, a non-transitory computer-readable medium is provided. The non-transitory computer-readable medium storing program instructions that, when executed by at least one computer or processor, cause a computer-controlled system to perform a method of morphing multiple video streams into a single video stream. In one embodiment, the method includes: receiving multiple video streams at an encoding device, wherein each multiple video stream is formed by a plurality of video frames, wherein the multiple video streams are configured such that each multiple video stream provides a different content view than other streams of the multiple video streams; encoding the plurality of video frames for each multiple video stream at multiple bitrates to form multiple resolution qualities for each multiple video stream, wherein the multiple resolution qualities range from a highest resolution quality to a lowest resolution quality; and combining streams for the multiple resolution qualities of the multiple video streams to form a video bunch frame stream.

Additional advantages and embodiments will be set forth in part in the description which follows or may be learned by practice. It is to be understood that both the foregoing brief summary and the following detailed description are exemplary embodiments for explanatory purposes and are not restrictive.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings.

DETAILED DESCRIPTION

Before the present methods, processes, and systems are disclosed and described, it is to be understood that the methods, processes and systems are not limited to specific synthetic methods, specific components, or to particular compositions, as such may vary. It is also to be understood that the terminology used herein is for purposes of describing particular embodiments only and is not intended to be limiting.

As used in the diagrams and descriptions, the singular forms "a", "an" and "the" include plural referents unless the context clearly dictates otherwise.

"Exemplary" as used herein means "an example of" and is not meant to convey a sense of an ideal or preferred embodiment.

"Optional" or "optionally" means that the subsequently described event or circumstance may or may not occur, and that the description includes instances where said event or circumstance occurs and instances where it does not.

The present invention may be understood more readily by reference to the following detailed description of preferred embodiments and the examples included therein and to the Figures and their previous and following description.

The present invention is directed to methods, processes, and systems for capturing or uploading, encoding, and streaming monoscopic and stereoscopic multiple video streams morphed into single view for presentation. In one embodiment, the methods, processes, and systems can comprise live capturing or receiving a plurality of monoscopic or stereoscopic video frame feeds; encoding and converting frame streams into a video bunch streams or files, consisting of a plurality of video frames in a plurality of resolution qualities; and streaming bunch frames to a viewer client device as determined by request from viewer client device.

Figure 1:
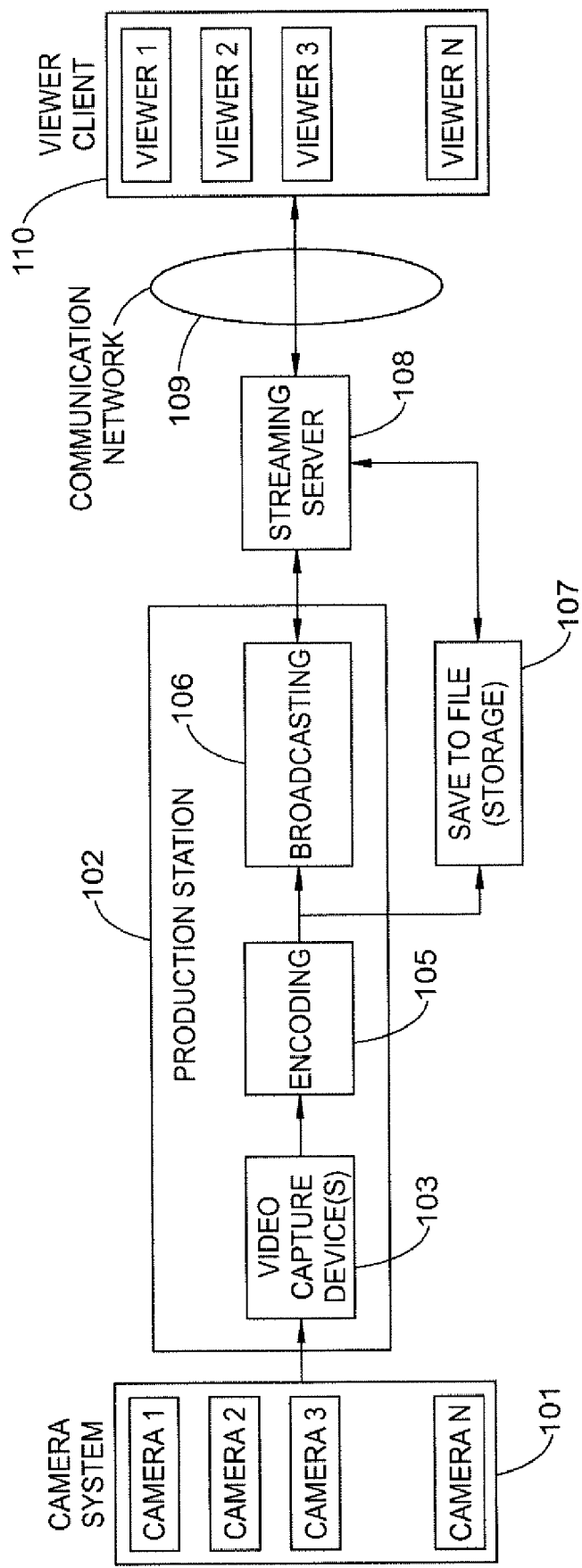
FIG. 1 illustrates an exemplary hardware and software environment for the methods, processes, and systems for streaming monoscopic or stereoscopic videos simultaneously from multiple sources.

FIG. 1 illustrates an exemplary hardware and software environment implemented in accordance with some embodiments of the methods, processes, and systems for streaming monoscopic or stereoscopic videos simultaneously from multiple sources. As illustrated the exemplary hardware and software environment includes a camera system 101; a production station 102, consisting of a video capture module 103, an encoding module 105, and a broadcasting module 106; a storage device assembly 107; a streaming server 108; a communications network 109, and a viewer client device 110. The network connecting the camera system 101, production station 102, storage device assembly 107, streaming server 108, communications network 109, and the viewer client device 110 may be partially or entirely interconnected via a network comprised of, for example, a local area network (LAN), a wireless LAN (WLAN), a metropolitan area network (MAN), a universal serial bus (USB), a hybrid fiber-coaxial (HFC) network, a satellite network, an Ethernet network, a wireless MAN (WMAN), a wide area network (WAN), a wireless WAN (WWAN), a personal area network (PAN), a wireless PAN (WPAN), the internet, and/or wireless standards such as, for example, IEEE 802.11 standards, WiFi, Bluetooth, infrared, WiMax, Long Term Evolution (LTE), or any suitable communication network in any suitable combination. The exemplary hardware and software environment formed by these components may also include any other suitable elements to facilitate capturing or uploading, encoding, and streaming monoscopic and stereoscopic videos for viewing.

The camera system 101 consists of individual cameras numbering 1 to N and supporting monoscopic or stereoscopic video, depending on the specific implementation of the present invention. Each camera sends a video feed to the video capture module 103.

The production station 102, comprised of a video capture module 103, an encoding module 105, and a broadcasting module 106, may be one computing device or each module may be implemented on separate computing devices.

The video capture module 103 is comprised of a plurality of internal or external video capture devices. A video capture device is needed to capture video from each camera. The number of video capture devices is dependent on the number of inputs per video capture device and the number of cameras. The video capture module captures and temporarily stores video feeds from the camera system 101 before transmission to the encoding module 105.

The encoding module 105 consists of a plurality of computer CPUs and/or GPUs that converts the monoscopic or stereoscopic video stream, received from the video capture device(s) 103, into a video bunch frame streams or files. The encoding module produces the video bunch frame stream by encoding each piece in a plurality of resolution qualities. The encoding module may utilize any suitable codec, including any current or future standard codec (e.g., H.264, H.265, etc.).

The storage device assembly 107 is comprised of a plurality of storage devices that can optionally receive and save a video bunch frame streams from the encoding module 105. The plurality of storage devices may include internal hard drives, external hard drives, solid state drives (SSDs), VRAMs, DRAMs, network attached storage (NAS) devices, USB thumb drives, flash drives, memory cards, optical drives (e.g., CD drives, DVD drives, etc.), cloud storage (e.g., Amazon S3, Google Drive, Sky Drive, etc.), and other suitable storage devices in any suitable combination.

The broadcasting module 106 receives and temporarily stores a video bunch frame streams from the encoding module 105. Based on request from the viewer client device 110 the broadcasting module sends pieces of the video bunch frame streams to the streaming server 108.

The streaming server 108 is comprised of a plurality of streaming servers that receive video bunch frame streams from the broadcasting module 106 or read from the storage device assembly 107 based on request by the viewer client device 110. The streaming server assembly sends the video bunch frame streams, as request by viewer, to the viewer client device via the communications network 109.

The viewer client device 110 communicates to the streaming server 108, and displays the received video bunch frame streams from the streaming server 108 via the communications network 109. The viewer client device 110 operates on a plurality of viewer devices with each viewer device communicating and receiving a unique set of pieces of the video bunch frame streams from the streaming server 108. The viewer client device 110 can operate on any user device capable of receipt and playback of monoscopic or stereoscopic video, e.g., personal computing device, smartphone, virtual reality headset, etc.

Figure 2:
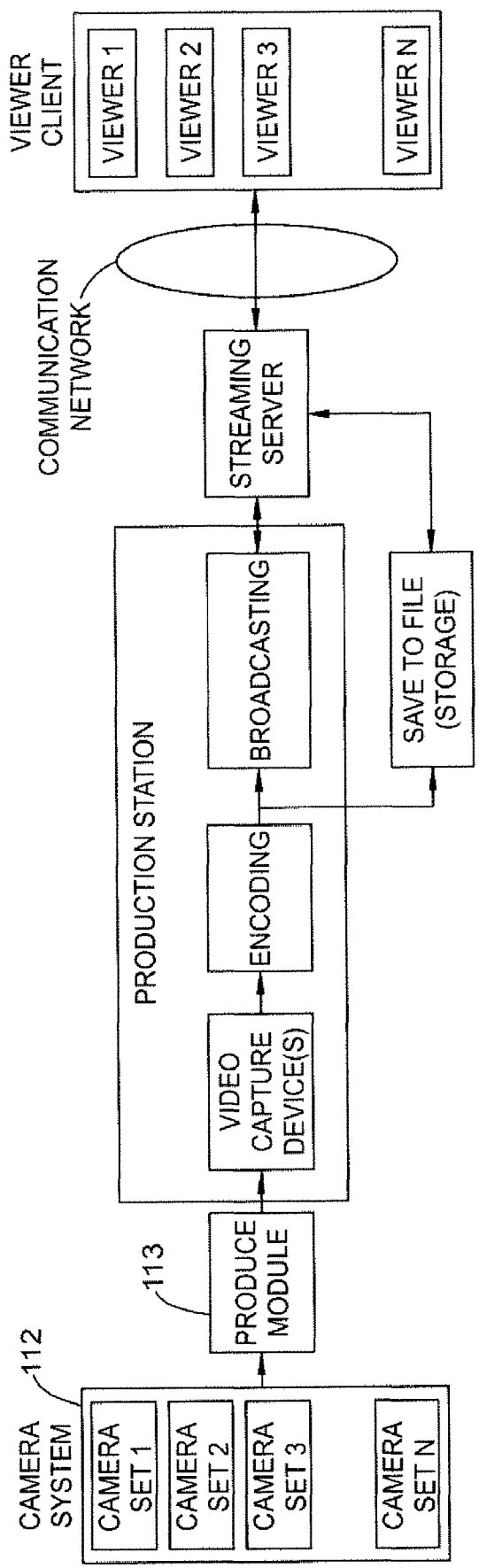
FIG. 2 illustrates an exemplary method, process, and system for streaming monoscopic or stereoscopic videos utilizing camera feeds and manual switching between cameras video feeds at the production level.

FIG. 2 illustrates an exemplary method, process, and system for streaming monoscopic or stereoscopic videos utilizing camera feeds and manual switching between camera video feeds at the production level. FIG. 2 shows a further embodiment of FIG. 1, in which the camera system 112 is comprised of a plurality of camera sets, each consisting of individual cameras numbering 1 to N and supporting the capture of monoscopic or stereoscopic video. In this embodiment, each camera set sends video streams to a producer subsystem 113. The producer subsystem allows for the manual selection of a single camera set. Only the camera set actively selected by the producer subsystem sends the video feeds for the cameras comprising the selected camera set to the video capture module for processing and eventual playback in the viewer client device.

Figure 3:
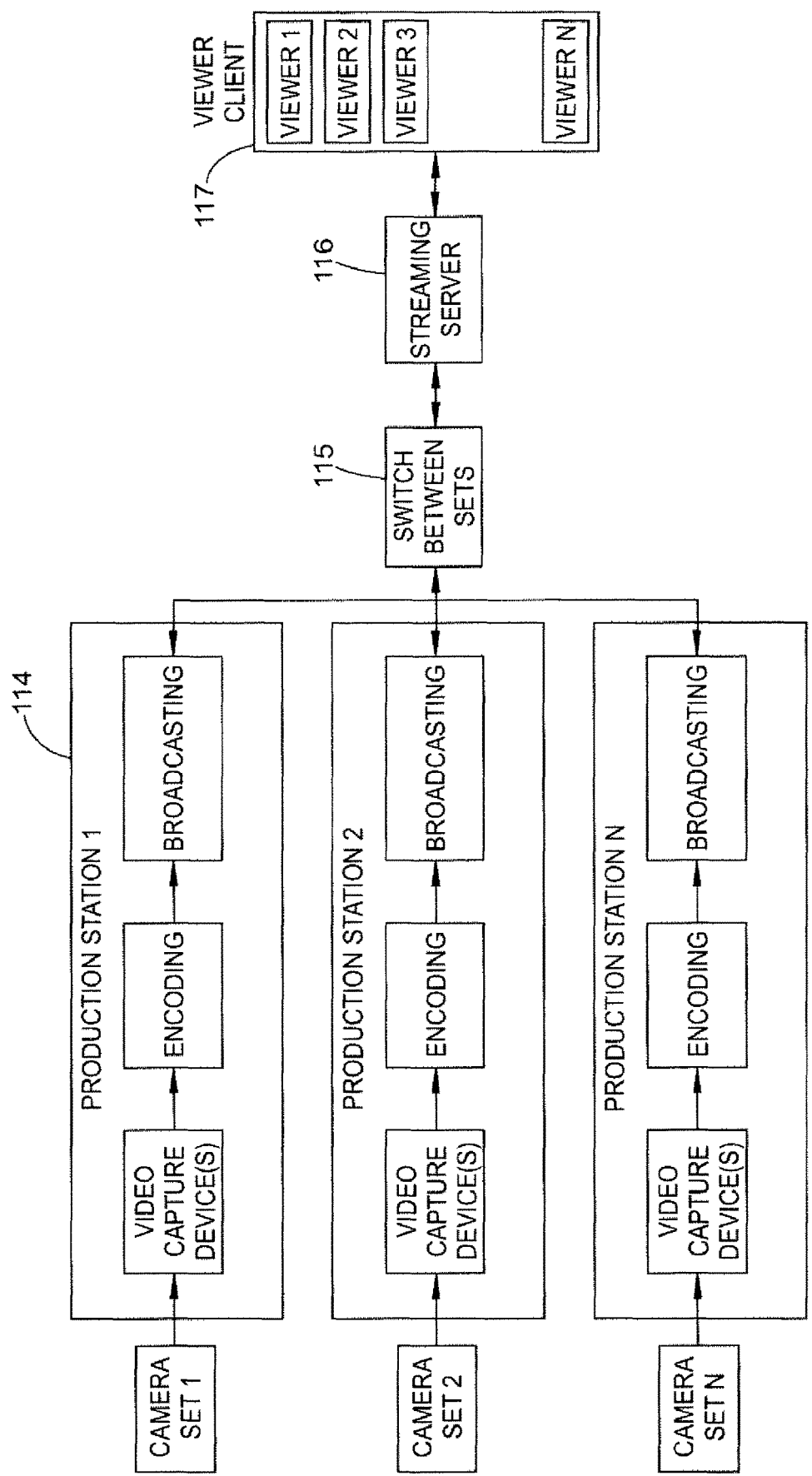
FIG. 3 illustrates an exemplary method, process, and system for streaming monoscopic or stereoscopic videos utilizing multiple camera sets, each with a designated production station, and manual switching between video feeds at the playback level.

FIG. 3 illustrates an exemplary method, process, and system for streaming monoscopic or stereoscopic videos utilizing multiple camera sets, each with a designated production station 114, and manual switching between video feeds 115 at the playback level. FIG. 3 shows a further embodiment of FIG. 1, in which a plurality of camera sets each have a dedicated production station 114. In this embodiment, each camera set and dedicated production station produces a unique video bunch frame stream. The viewer client device 117 communicates a manual camera set selection to the streaming server 116, which switches between the unique video bunch frame streams 115 and sends the video bunch frame stream from the selected camera set to the viewer client device 117 for playback.

Figure 4:
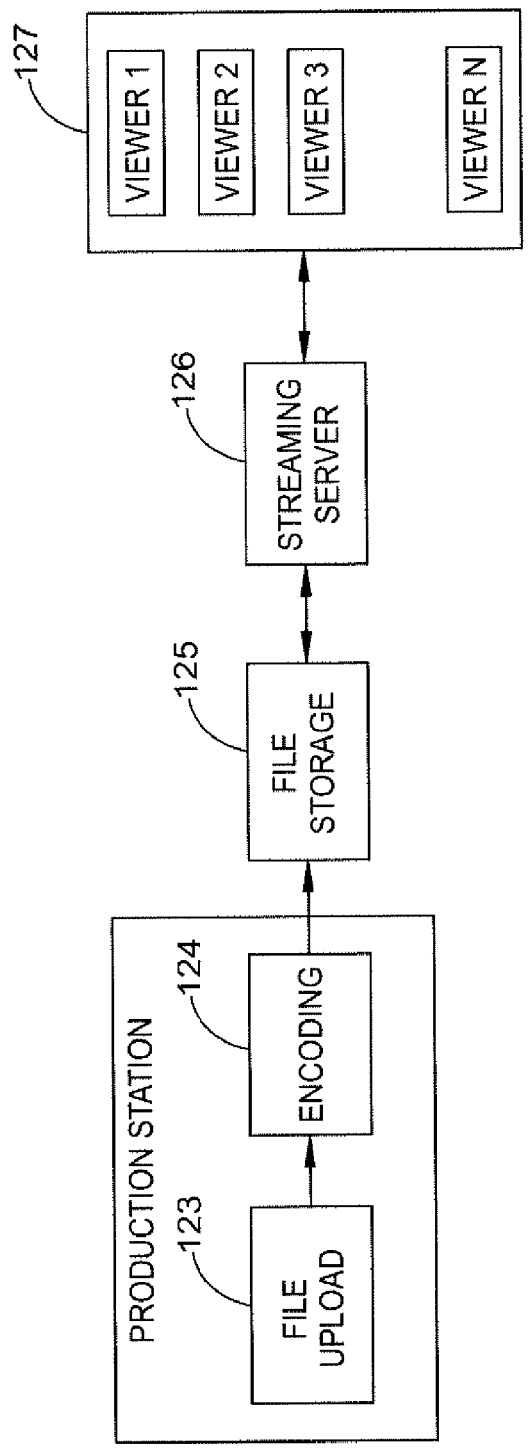
FIG. 4 illustrates an exemplary method, process, and system for uploading and streaming previously produced monoscopic or stereoscopic video files.

FIG. 4 illustrates an exemplary method, process, and system for uploading and streaming previously produced monoscopic or stereoscopic video files. FIG. 4 shows a further embodiment of the production station in FIG. 1, in which the production station 122 is comprised of a file upload module 123, and an encoding module 124. In this embodiment, a previously produced monoscopic or stereoscopic video file is uploaded to the file upload module 123, eliminating the need for a camera system and video capture module. The encoding module 124 consists of a plurality of computer CPUs and/or GPUs that converts the monoscopic or stereoscopic video stream, received from the file upload module 123, into a video bunch frame stream or file. The encoding module produces the video bunch frame stream by encoding each video in a plurality of resolution qualities. The encoding module may utilize any suitable codec, including any current or future standard codec (e.g., H.264, H.265, etc.).

The storage device assembly 125 is comprised of a plurality of storage devices that can optionally receive and save a video bunch frame stream from the encoding module 124. The plurality of storage devices may include internal hard drives, external hard drives, solid state drives (SSDs), VRAMs, DRAMs, network attached storage (NAS) devices, USB thumb drives, flash drives, memory cards, optical drives (e.g., CD drives, DVD drives, etc.), cloud storage (e.g., Amazon S3, Google Drive, Sky Drive, etc.), and other suitable storage devices in any suitable combination.

The streaming server 126 is comprised of a plurality of streaming servers that read pieces of the video bunch frame stream read from the storage device assembly 125 based on request from the viewer client device 127. The streaming server sends the video bunch frame stream based on viewer client device 127 request.

Figure 5:
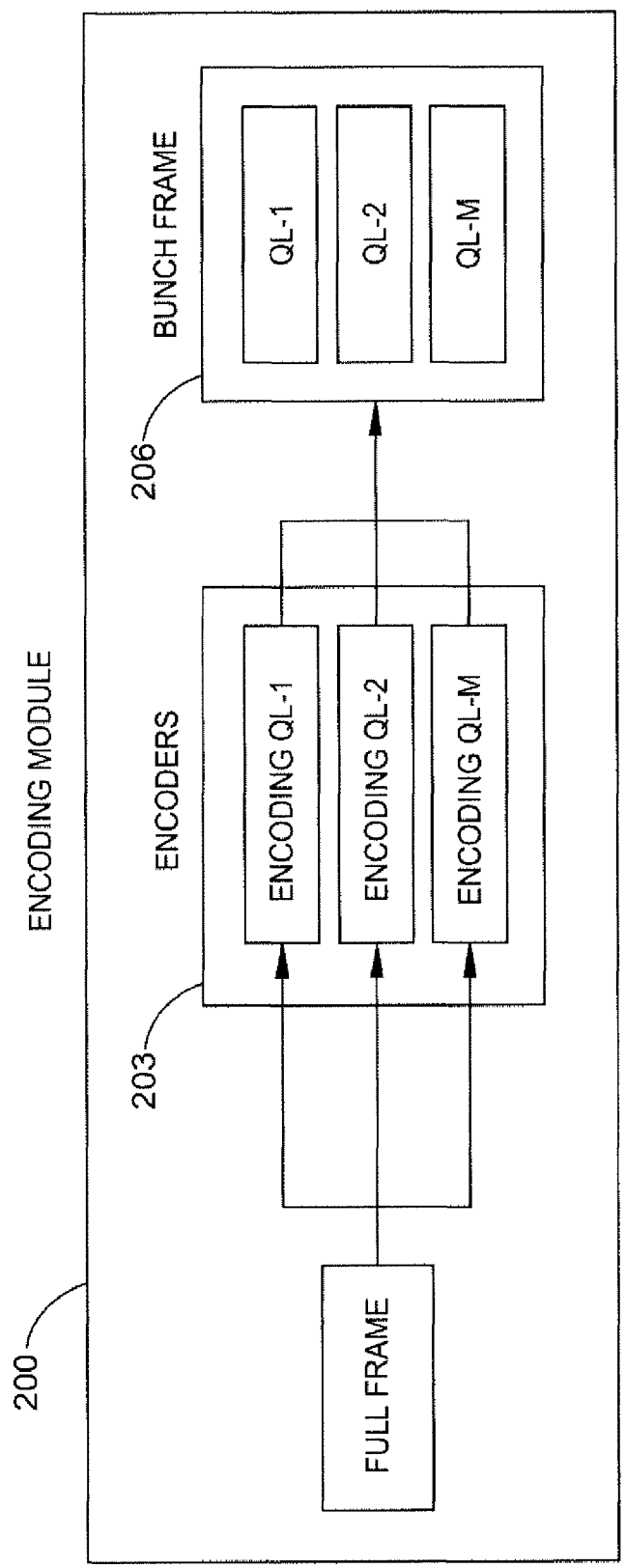
FIG. 5 is a flowchart of an exemplary method and process for multi encoding a full monoscopic or stereoscopic video frame, thereby converting the video frame into a bunch frame set.

FIG. 5 is a flowchart of an exemplary method and process for multi encoding a full monoscopic or stereoscopic video frame, thereby converting the video frame into a bunch frame set. FIG. 5 shows an embodiment of the method and process utilized by an encoding module 200. Each video capture device being associated with a corresponding camera of a camera set. The encoding module 200 encodes the full frame into a plurality of resolution qualities [(QL1) ... (QLM)] frames 203, the number of which are variable based on the desired configuration. After encoding 203 the plurality of resolution qualities of each frame is combined into a video bunch frame set 206. The bunch frame set consists of two types of frames, Intra frames (key frames) and Predicted frames (delta frames). The video bunch frame stream consists of a combination of Intra and Predicted frames (IPP-PIPPPI ... ).

Figure 6:
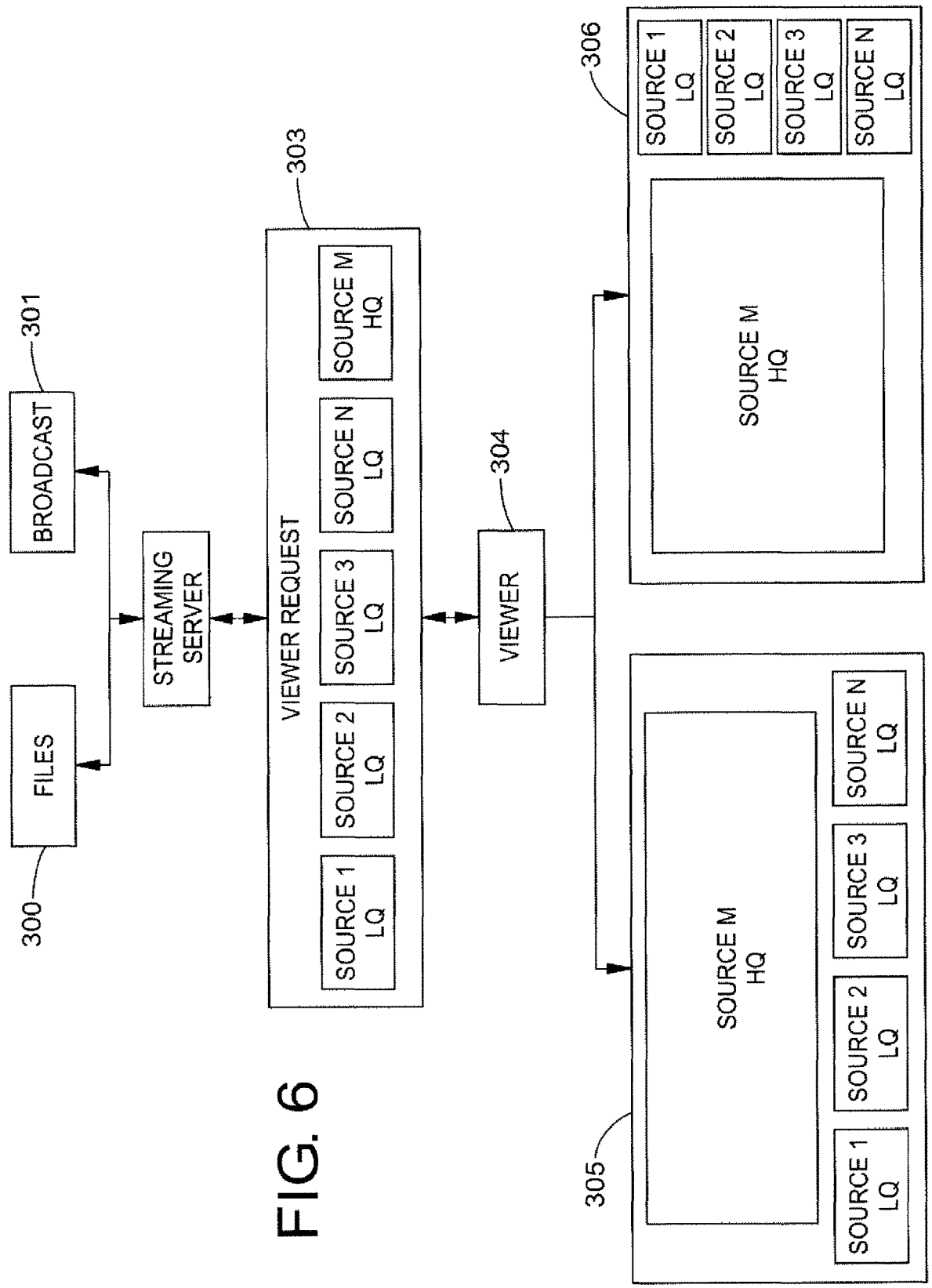
FIG. 6 is a flowchart of an exemplary method and process for identifying, streaming, and displaying monoscopic or stereoscopic video bunch frames, consisting of Intra Frames (Key Frames) and Predicted Frames (Delta Frames), as determined by the request from the viewer client device and displayed separately in a viewer client device.

FIG. 6 is a flowchart of an exemplary method and process for identifying, streaming, and displaying monoscopic or stereoscopic video bunch frames, consisting of Intra Frames (Key Frames) and Predicted Frames (Delta Frames), as determined by request from the viewer client device and displayed separately in a viewer client device. In this embodiment, monoscopic or stereoscopic video bunch frames are streamed from a storage device 300 or a broadcast module 301. The memory and broadcast modules contain a videos bunch frame set, which together includes the plurality of resolution qualities for each video source frame. The embodiment in FIG. 6 only shows two resolution qualities, low quality (LQ) and high quality (HQ), while other embodiments utilize a plurality of resolution qualities [(QL1) ... (QLM)]. There are two types of split frames— Intra frames (key frames) and Predicted frames (delta frames). The video bunch stream consists of a combination of Intra and Predicted frames (IPPPIPPPI ... ).

The streaming server 302 receives the video bunch frame stream from the memory 300 and broadcast 301 modules. The viewer client device 304 connects to the streaming server 302 and, after the connection is established, sends request for quality combination to the streaming server. Quality combination based specific implementation of the request in the viewer client device 303. Based on the quality request received from the viewer client device and the current frame status (Intra frame or Predicted frame), the streaming server selects and stream a unique set of streams from each source with the necessary resolution qualities, which is sent to the viewer client device for display 304. This process results in high quality frames being displayed separately in larger area from low quality frames in the viewer client device 303. When new request from the client device 303 received, the streaming server adjusts quality of the each streamed source in real time. In this embodiment, the frames from each source are displayed in the viewer client device based on application. The frames can be positioned in very combinations (305, 306).

Figure 7:
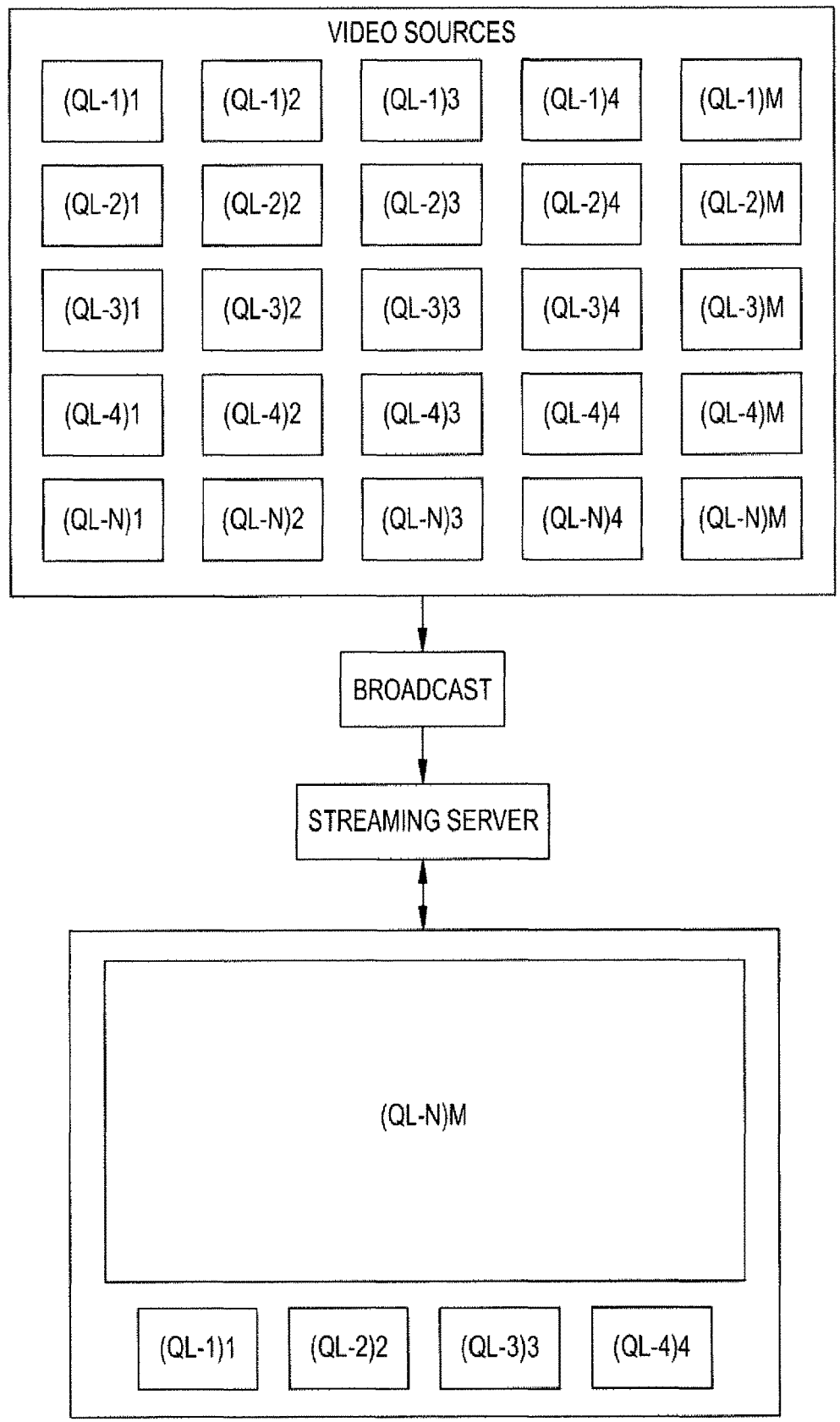
FIG. 7 is a flowchart of an exemplary method, process, and system for streaming and displaying monoscopic or stereoscopic video bunch frames when M levels of qualities are utilized.

FIG. 7 is a flowchart of an exemplary method, process, and system for streaming and displaying monoscopic or stereoscopic video bunch frames from video sources when (QL1)...(QLM) quality levels of bunch frames are utilized. FIG. 7 shows another embodiment of FIG. 6, that illustrates the video bunch frame stream containing a plurality of resolution qualities for each frame source.

Figure 8:
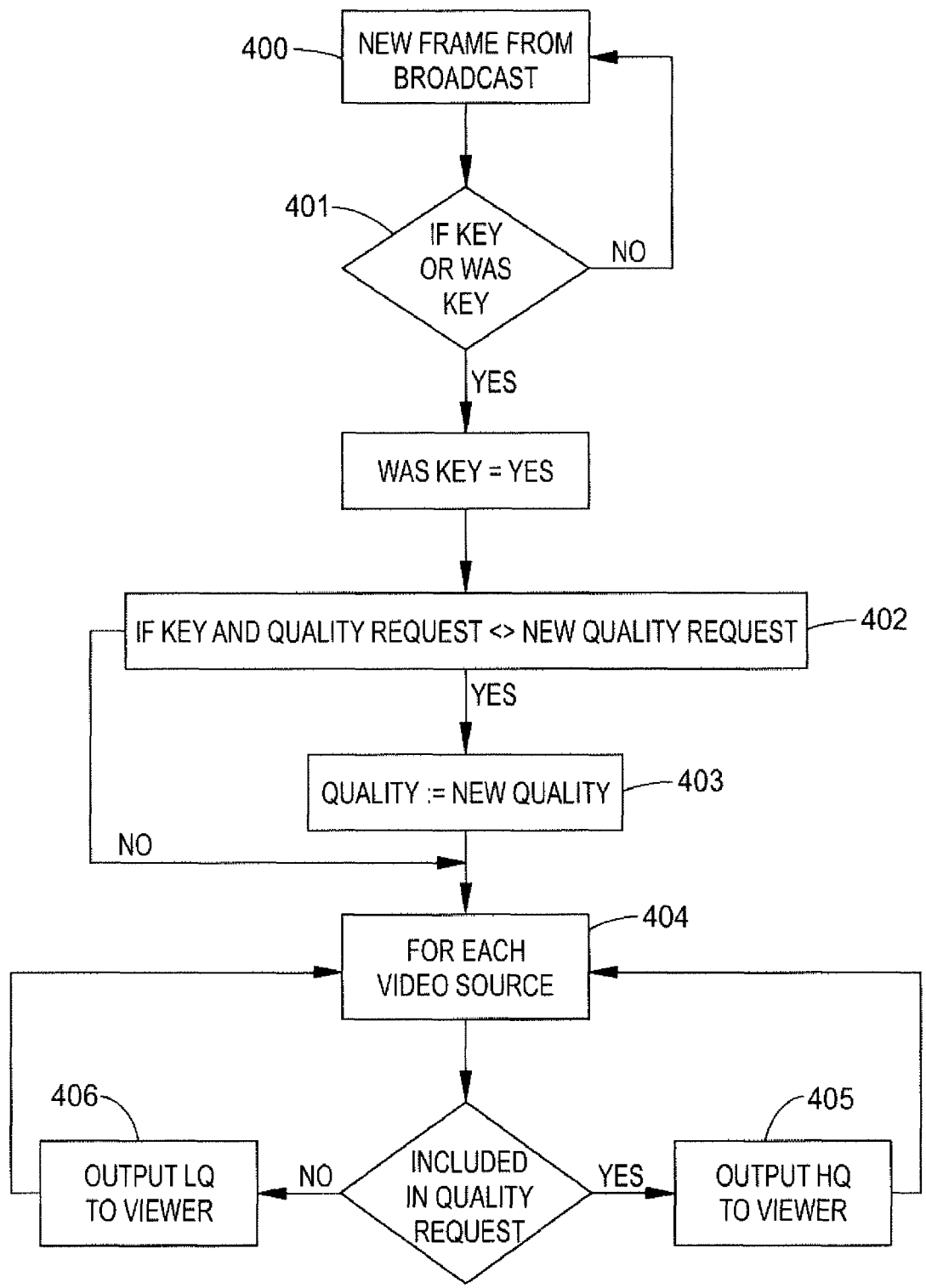
FIG. 8 is a flowchart of an exemplary method, process, and system for identifying and streaming a monoscopic or stereoscopic video bunch frame set, consisting of a particular combination of Intra Frames (Key Frames) and Predicted Frames (Delta Frames), as determined by the Region of Interest selected by the viewer client device.

FIG. 8 is a flowchart of an exemplary method, process, and system for identifying and streaming a monoscopic or stereoscopic video bunch frame sets, consisting of a particular combination of Intra Frames (Key Frames) and Predicted Frames (Delta Frames), as determined by request from the viewer client device. The current embodiment explains the process accounting for changes in the resolution qualities of frame sources comprising the unique video bunch frame streams for the viewer client device, i.e. When the request from the viewer client device changes, the composition of the frames comprising the unique video bunch frame streams changes based on new Request and on the current Infra frame so that high quality frame pieces are displayed in the viewer client device.

While streaming a monoscopic or stereoscopic video, the streaming server receives new frame bunch data from the broadcast module 400. When receiving new frame data, the streaming server checks to see if an Intra (I) frame is received 401. The streaming server skips new frame data until an Intra frame is received 401. If an Intra frame is received and the Request from the viewer client device did not change, then the frame quality output does not change 402. If an Intra frame is received and the Request received from the viewer client device have changed, then the frame quality output is changed by the streaming server 403. Each frame in the video frame bunch is checked 404. If a frame is corresponded to high resolution request, the video bunch frame stream output to the viewer client device is the high resolution version of the frame 405. If a frame is corresponded to low resolution request, the video bunch frame stream output to the viewer client device is the low resolution version of the frame 406.

Figure 9:
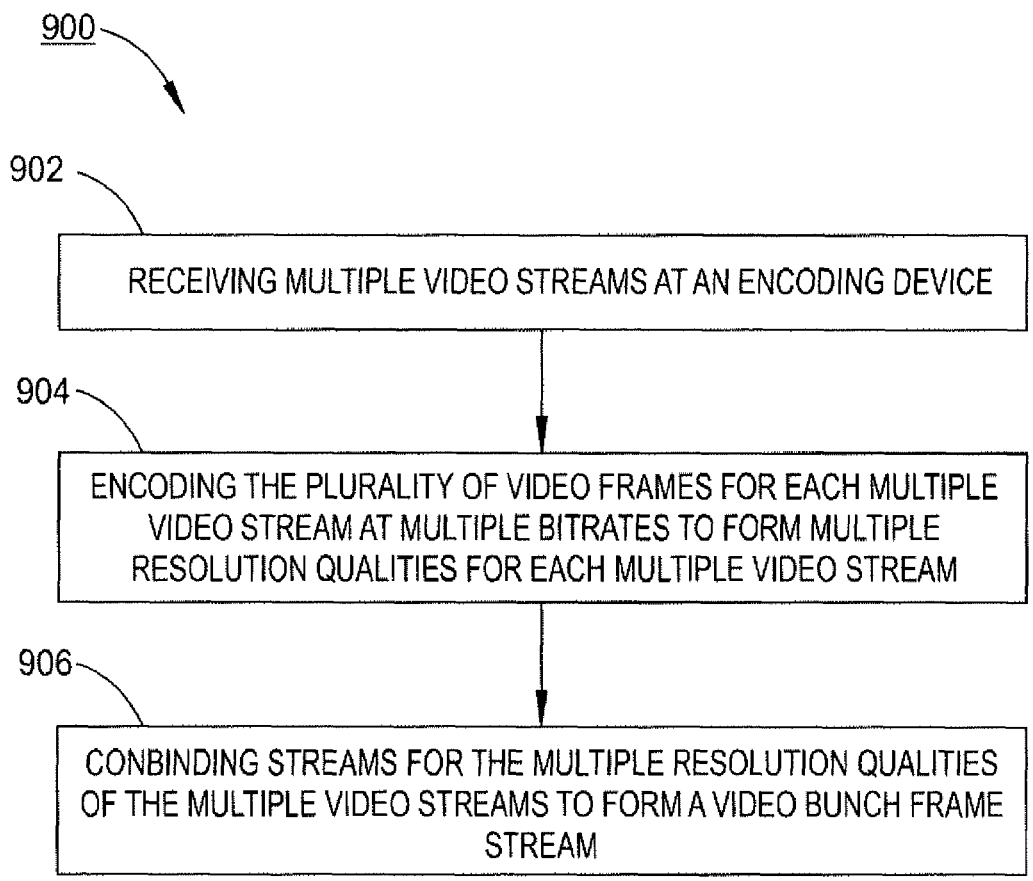
FIG. 9 is a flow chart of an exemplary embodiment of a process for morphing multiple video streams into a single video stream.

With reference to FIG. 9, an exemplary embodiment of a process 900 for morphing multiple video streams into a single video stream begins at 902 where multiple video streams are received at an encoding device. Each multiple video stream is formed by a plurality of video frames. The multiple video streams are configured such that each multiple video stream provides a different content view than other streams of the multiple video streams. At 904, the plurality of video frames for each multiple video stream are encoded at multiple bitrates to form multiple resolution qualities for each multiple video stream. The multiple resolution qualities range from a highest resolution quality to a lowest resolution quality. Next, streams for the multiple resolution qualities of the multiple video streams are combined to form a video bunch frame stream (906).

In another embodiment of the process 900, the different content views of the multiple video streams provide scenes of an event from different viewing points. In yet another embodiment of the process 900, the different content views of the multiple video streams provide scenes of different events. In still another embodiment of the process 900, each multiple video stream is defined by a predetermined configuration such that the predetermined configuration is consistent from frame-to-frame. In this embodiment, the predetermined configuration for each multiple video stream includes shape and size parameters for the corresponding content view in a manner that permits different multiple video streams to have different shapes and different sizes. In still yet another embodiment of the process 900, the multiple bitrates for each multiple video stream include at least three bitrates such that the multiple resolution qualities for each multiple video stream include a high resolution quality, at least one intermediate resolution quality, and a low resolution quality.

Figure 10:
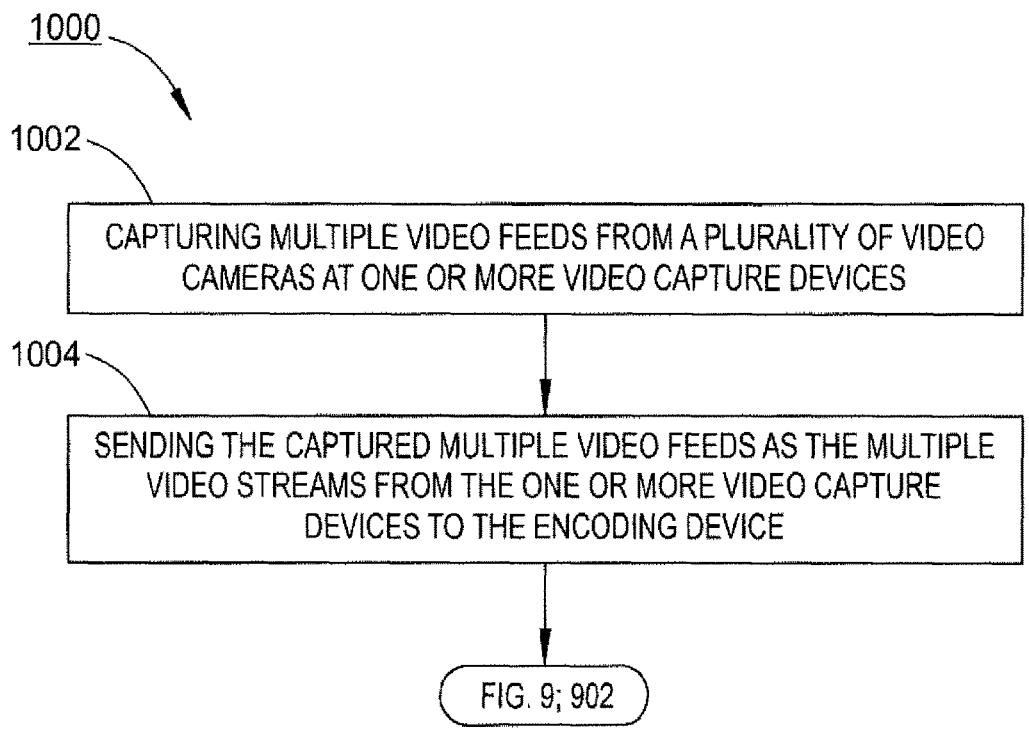
FIG. 10, in combination with FIG. 9, provide a flow chart of another exemplary embodiment of a process for morphing multiple video streams into a single video stream.

With reference to FIGS. 9 and 10, an embodiment of a process 1000 for morphing multiple video streams into a single video stream begins at 1002 where multiple video feeds from a plurality of video cameras are captured at one or more video capture devices. The plurality of video cameras are configured such that each multiple video feed provides a different content view than other feeds of the multiple video feeds. At 1004, the captured multiple video feeds are sent as the multiple video streams from the one or more video capture devices to the encoding device.

Figure 11:
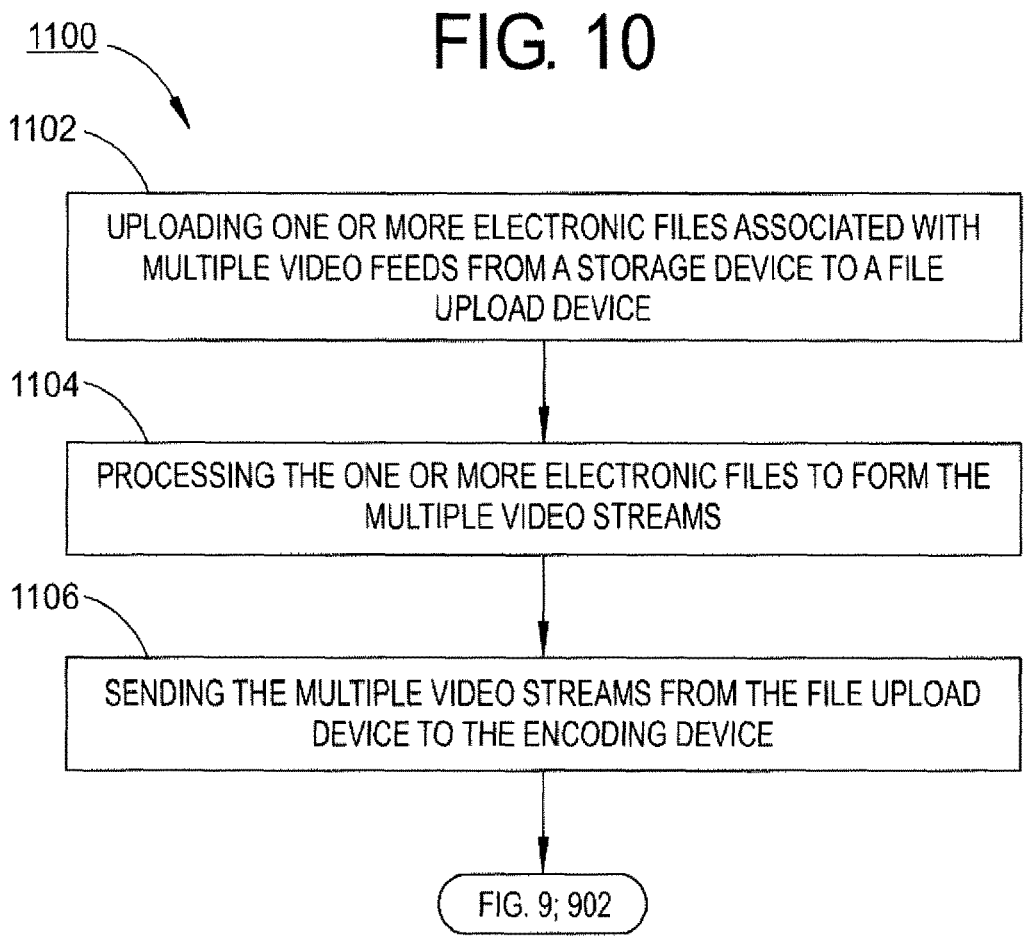
FIG. 11, in combination with FIG. 9, provide a flow chart of yet another exemplary embodiment of a process for morphing multiple video streams into a single video stream.

With reference to FIGS. 9 and 11, an embodiment of a process 1100 for morphing multiple video streams into a single video stream begins at 1102 where one or more electronic files associated with multiple video feeds are uploaded from a storage device to a file upload device. The multiple video feeds are configured such that each multiple video feed provides a different content view than other feeds of the multiple video feeds. At 1104, the one or more electronic files are processed to form the multiple video streams. Next, the multiple video streams are sent from the file upload device to the encoding device (1106).

Figure 12:
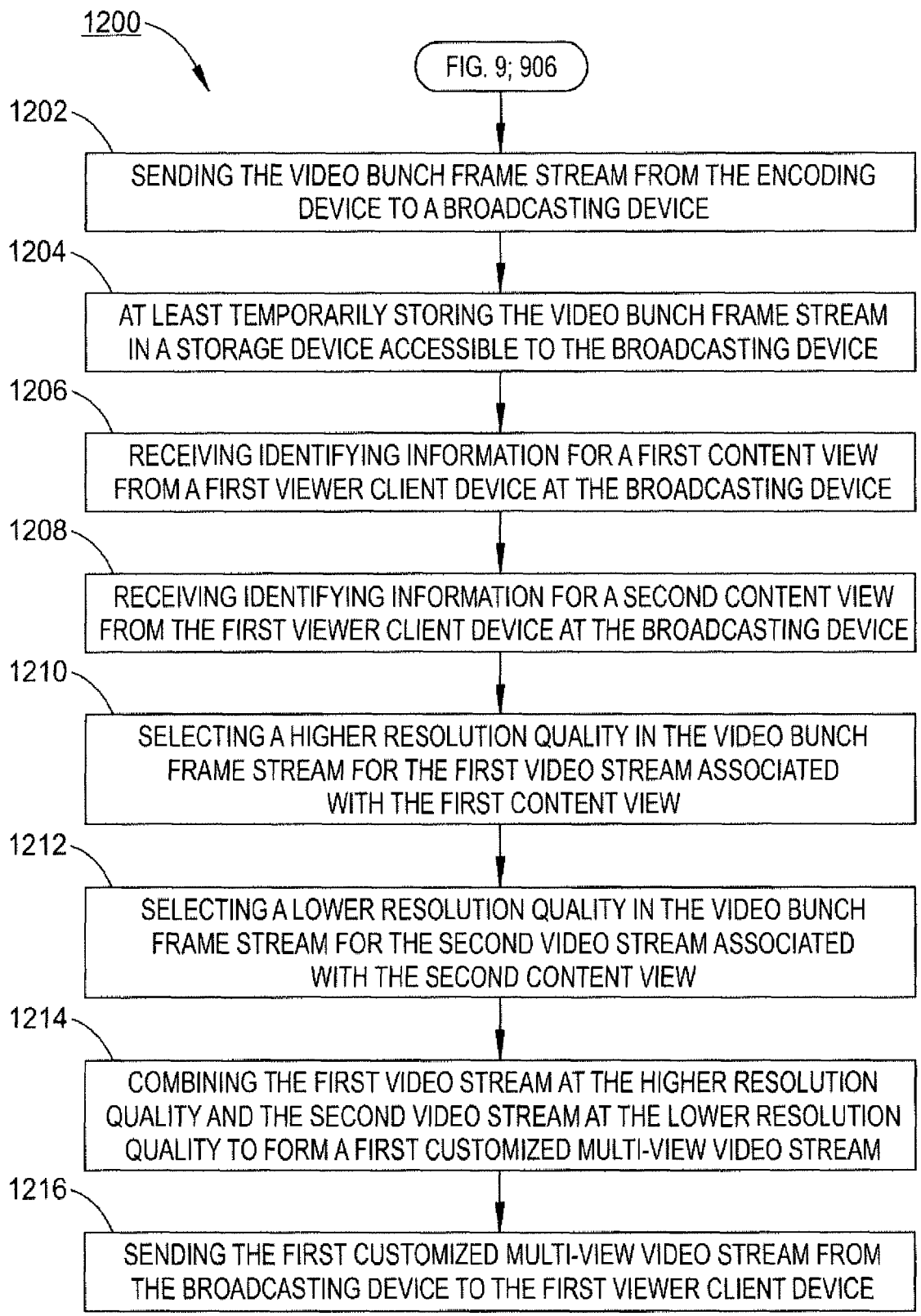
FIG. 12, in combination with FIG. 9, provide a flow chart of still another exemplary embodiment of a process for morphing multiple video streams into a single video stream.

With reference to FIGS. 9 and 12, an embodiment of a process 1200 for morphing multiple video streams into a single video stream includes the process 900 of FIG. 9 and continues from 906 to 1202 where the video bunch frame stream is sent from the encoding device to a broadcasting device. As 1204, the video bunch frame stream is at least temporarily stored in a storage device accessible to the broadcasting device. Next, identifying information for a first content view is received from a first viewer client device at the broadcasting device (1206). The first content view is representative of a corresponding first video stream of the multiple video streams. At 1208, identifying information for a second content view is received from the first viewer client device at the broadcasting device. The second content view is different from the first content view and representative of a corresponding second video stream of the multiple video streams. Next, a higher resolution quality in the video bunch frame stream is selected for the first video stream associated with the first content view (1210). At 1212, a lower resolution quality in the video bunch frame stream is selected for the second video stream associated with the second content view. Next, the first video stream at the higher resolution quality and the second video stream at the lower resolution quality are combined to form a first customized multi-view video stream (1214). At 1216, the first customized multi-view video stream is sent from the broadcasting device to the first viewer client device.

In another embodiment, the process 1200 also includes receiving identifying information for a first preferred content view from a second viewer client device at the broadcasting device. The first preferred content view is different from the first content view selected by the first viewer client device and representative of a corresponding first preferred video stream of the multiple video streams. Identifying information for a second preferred content view is received from the second viewer client device at the broadcasting device. The second preferred content view is different from the first preferred content view and representative of a corresponding second preferred video stream of the multiple video streams. A higher resolution quality in the video bunch frame stream is selected for the first preferred video stream associated with the first preferred content view. A lower resolution quality in the video bunch frame stream is selected for the second preferred video stream associated with the second preferred content view. The first preferred video stream at the higher resolution quality and the second preferred video stream at the lower resolution quality are combined to form a second customized multi-view video stream. In this embodiment, the second customized multi-view video stream is sent from the broadcasting device to the second viewer client device.

Figure 13A:
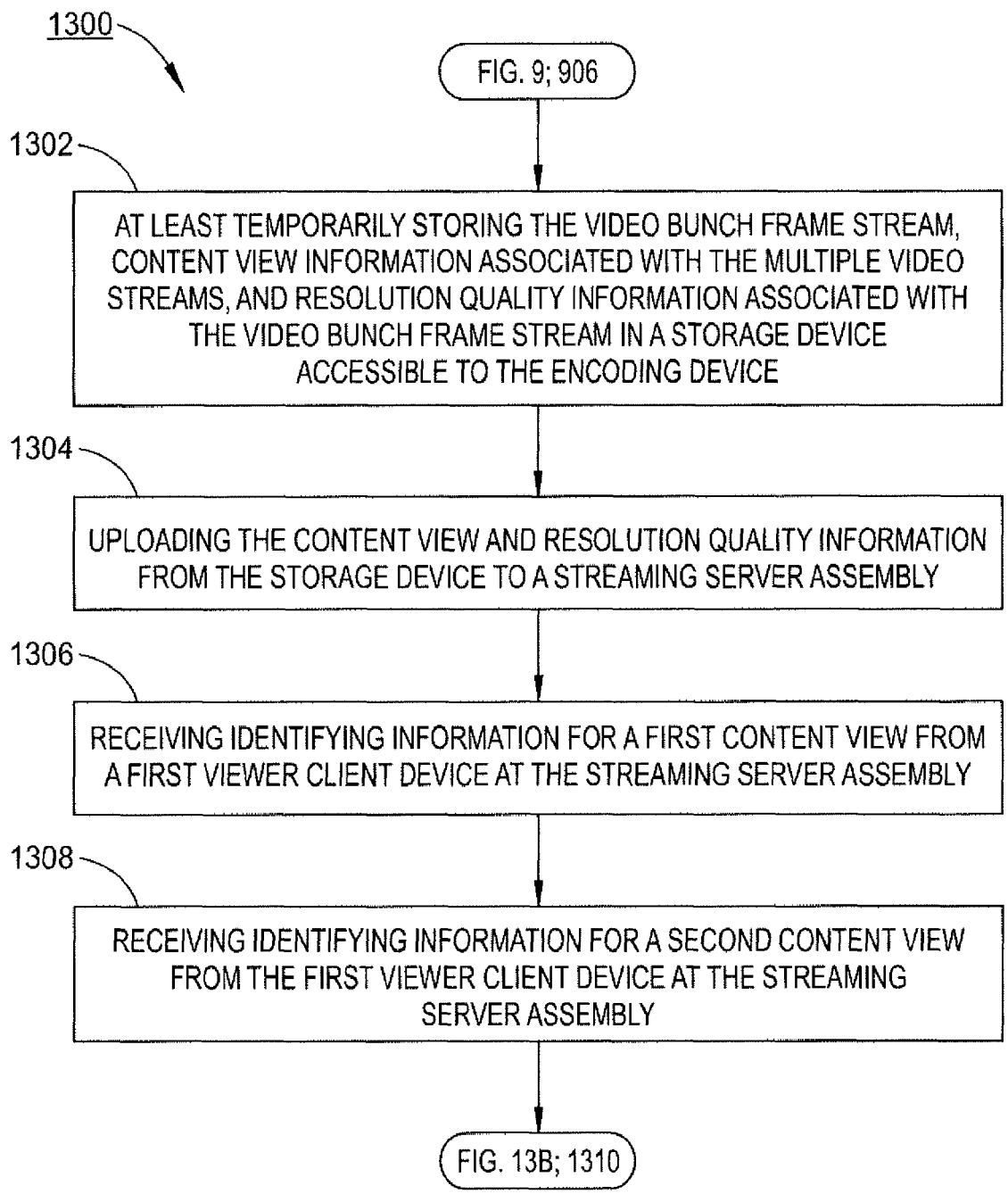
FIGS. 13A and 13B, in combination with FIG. 9, provide a flow chart of still yet another exemplary embodiment of a process for morphing multiple video streams into a single video stream.
Figure 13B:
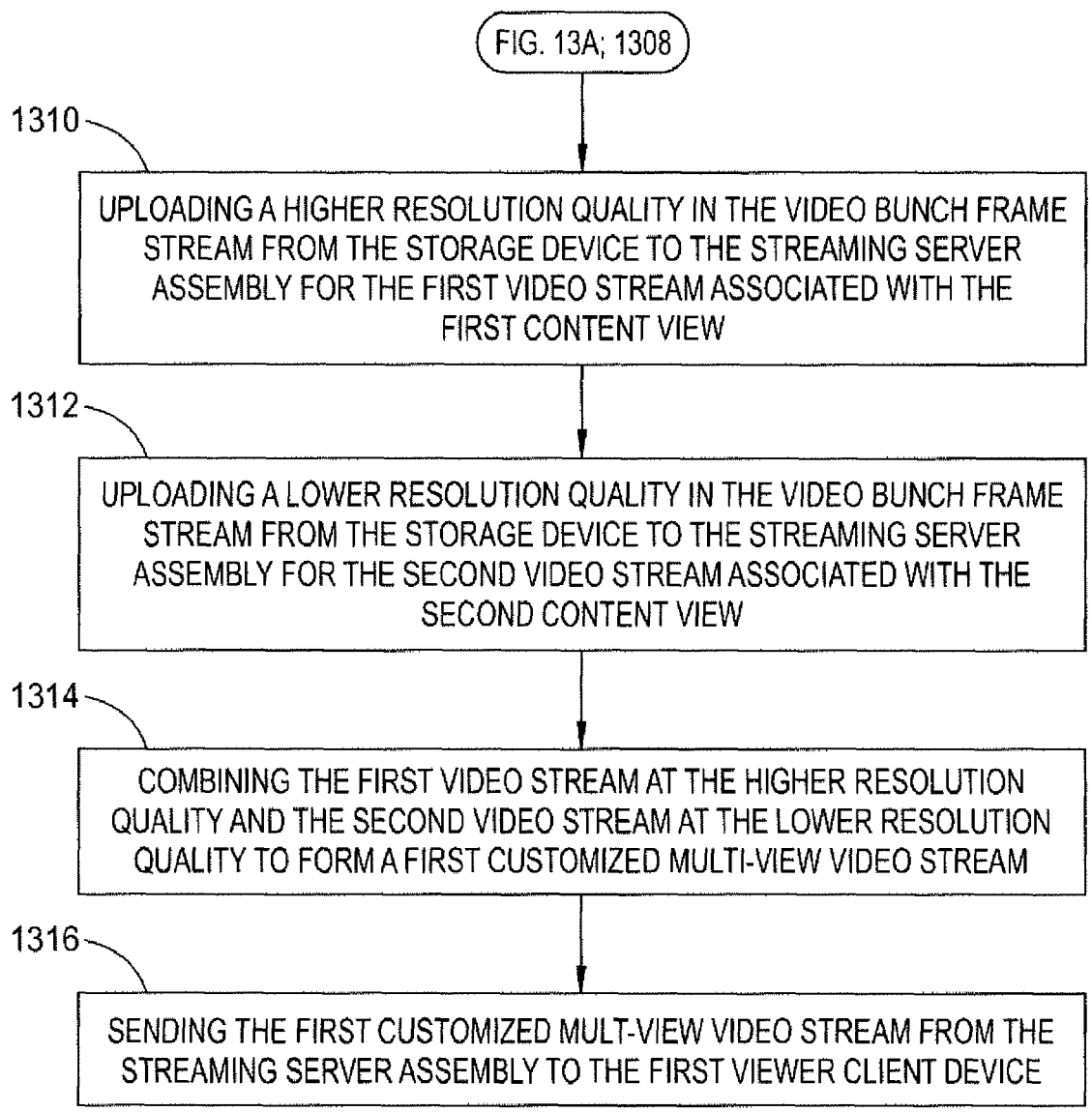

With reference to FIGS. 9, 13A, and 13B, an embodiment of a process 1300 for morphing multiple video streams into a single video stream includes the process 900 of FIG. 9 and continues from 906 to 1302 where the video bunch frame stream, content view information associated with the multiple video streams, and resolution quality information associated with the video bunch frame stream are at least temporarily stored in a storage device accessible to the encoding device. At 1304, the content view and resolution quality information are uploaded from the storage device to a streaming server assembly. Next, identifying information for a first content view is received from a first viewer client device at the streaming server assembly (1306). The first content view is representative of a corresponding first video stream of the multiple video streams. At 1308, identifying information for a second content view is received from the first viewer client device at the streaming server assembly. The second content view is different from the first content view and representative of a corresponding second video stream of the multiple video streams. Next, a higher resolution quality in the video bunch frame stream is uploaded from the storage device to the streaming server assembly for the first video stream associated with the first content view (1310). At 1312, a lower resolution quality in the video bunch frame stream is uploaded from the storage device to the streaming server assembly for the second video stream associated with the second content view. Next, the first video stream at the higher resolution quality and the second video stream at the lower resolution quality are combined to form a first customized multi-view video stream (1314). At 1316, the first customized multi-view video stream is sent from the streaming server assembly to the first viewer client device.

In another embodiment, the process 1300 also includes receiving identifying information for a first preferred content view from a second viewer client device at the streaming server assembly. The first preferred content view is different from the first content view selected by the first viewer client device and representative of a corresponding first preferred video stream of the multiple video streams. Identifying information for a second preferred content view is received from the second viewer client device at the streaming server assembly. The second preferred content view is different from the first preferred content view and representative of a corresponding second preferred video stream of the multiple video streams. A higher resolution quality in the video bunch frame stream is uploaded from the storage device to the streaming server assembly for the first preferred video stream associated with the first preferred content view. A lower resolution quality in the video bunch frame stream is uploaded from the storage device to the streaming server assembly for the second preferred video stream associated with the second preferred content view. The first preferred video stream at the higher resolution quality and the second preferred video stream at the lower resolution quality are combined to form a second customized multi-view video stream. In this embodiment, the second customized multi-view video stream is sent from the streaming server assembly to the second viewer client device.

Figure 14A:
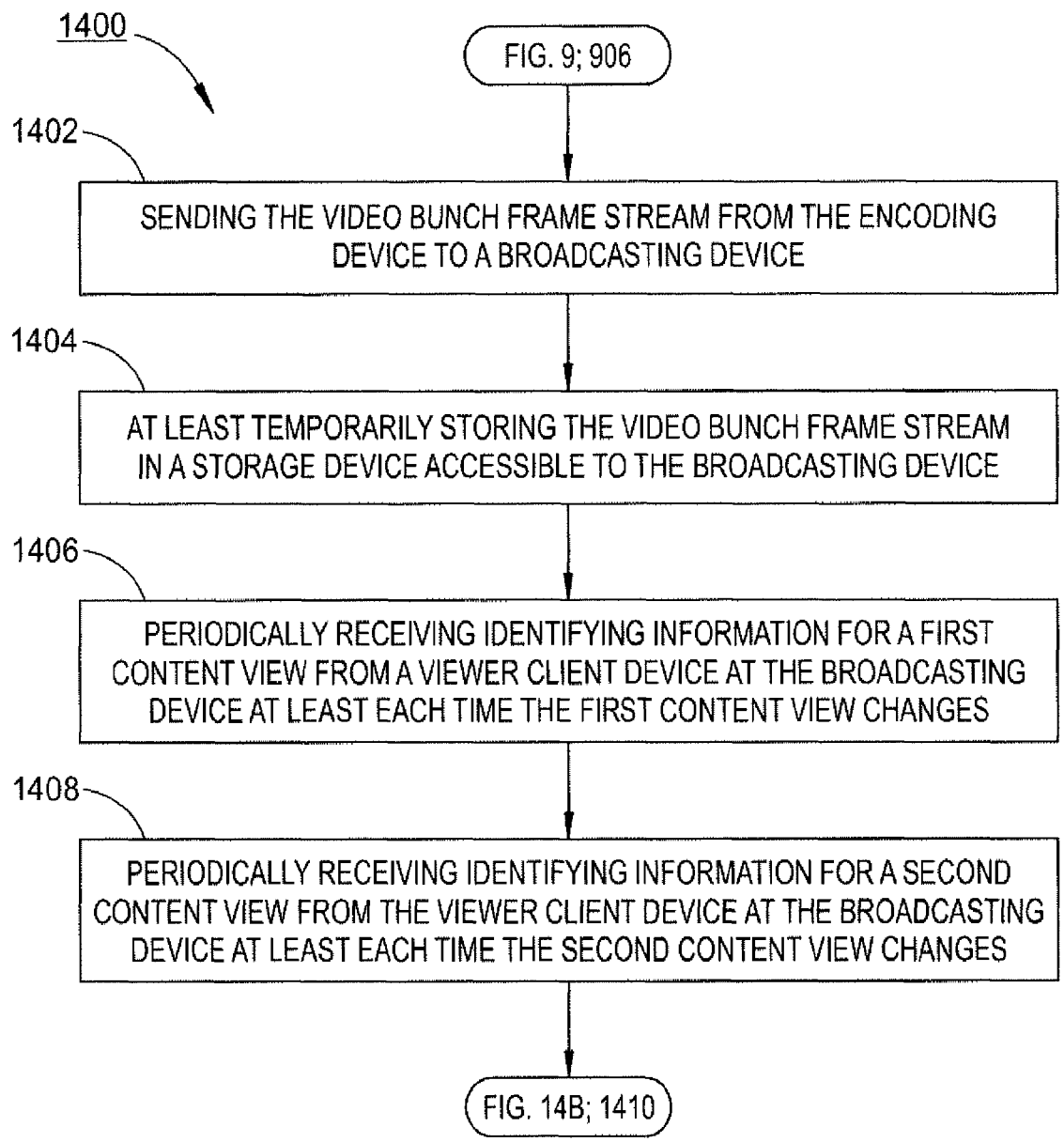
FIGS. 14A and 14B, in combination with FIG. 9, provide a flow chart of another exemplary embodiment of a process for morphing multiple video streams into a single video stream.
Figure 14B:
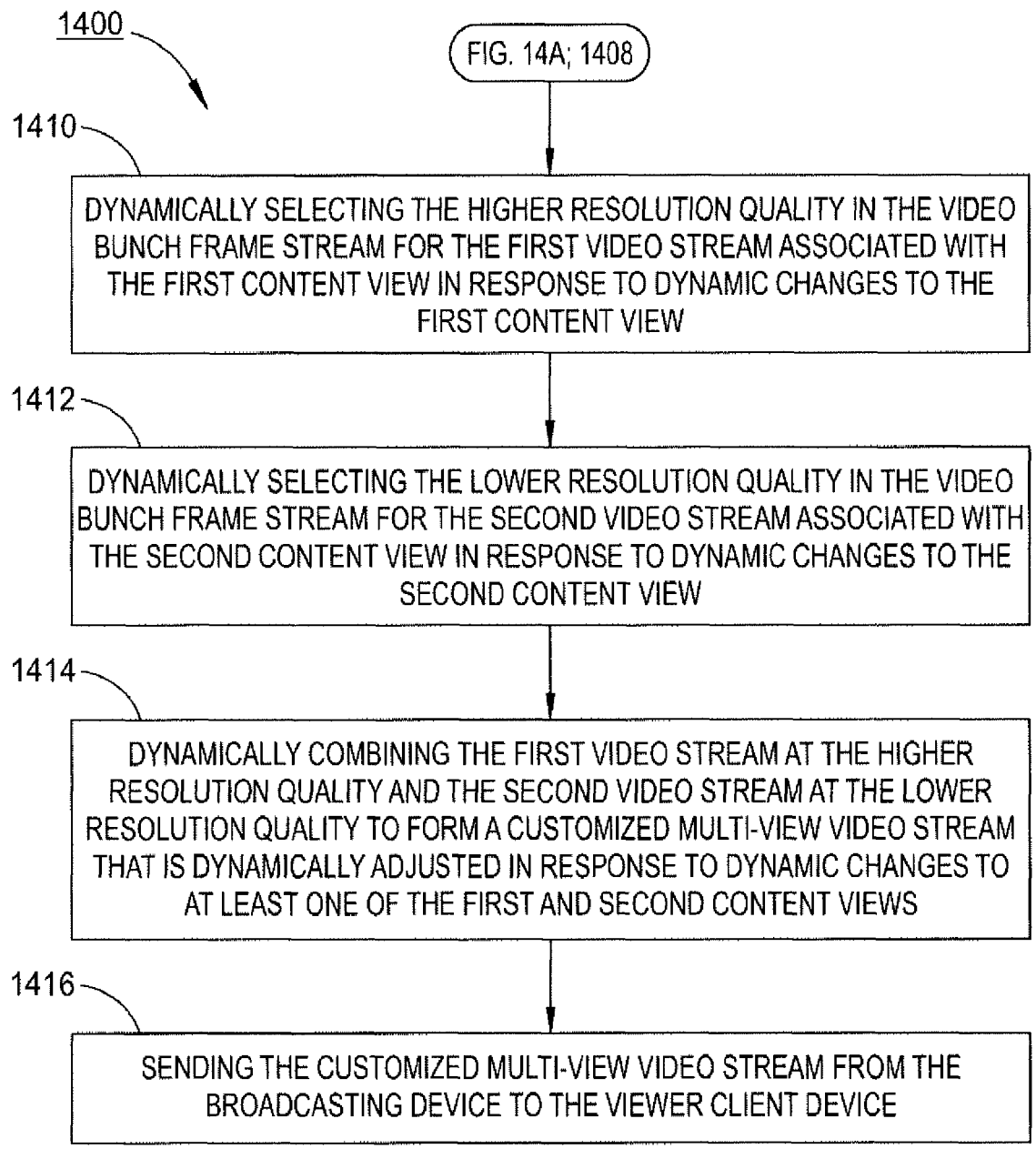

With reference to FIGS. 9, 14A, and 14B, an embodiment of a process 1400 for morphing multiple video streams into a single video stream includes the process 900 of FIG. 9 and continues from 906 to 1402 where the video bunch frame stream is sent from the encoding device to a broadcasting device. At 1404, the video bunch frame stream is at least temporarily storing in a storage device accessible to the broadcasting device. Next, identifying information for a first content view is periodically received from a viewer client device at the broadcasting device at least each time the first content view changes (1406). The viewer client device is configured to permit the first content view to dynamically change in response to user actions at the viewer client device to select which actual content view of the multiple video streams is to be displayed on the viewer client device at a higher resolution quality. The first content view is representative of a corresponding first video stream of the multiple video streams. At 1408, identifying information for a second content view is periodically received from the viewer client device at the broadcasting device at least each time the second content view changes. The viewer client device is configured to permit the second content view to dynamically change in response to user actions at the viewer client device to select which actual content view of the multiple video streams is to be displayed on the viewer client device at a lower resolution quality. The second content view is different from the first content view and representative of a corresponding second video stream of the multiple video streams. Next, the higher resolution quality in the video bunch frame stream is dynamically selected for the first video stream associated with the first content view in response to dynamic changes to the first content view (1410). At 1412, the lower resolution quality in the video bunch frame stream is dynamically selected for the second video stream associated with the second content view in response to dynamic changes to the second content view. Next, the first video stream at the higher resolution quality and the second video stream at the lower resolution quality are dynamically combined to form a customized multi-view video stream that is dynamically adjusted in response to dynamic changes to at least one of the first and second content views (1414). At 1416, the customized multi-view video stream is sent from the broadcasting device to the viewer client device.

Figure 15A:
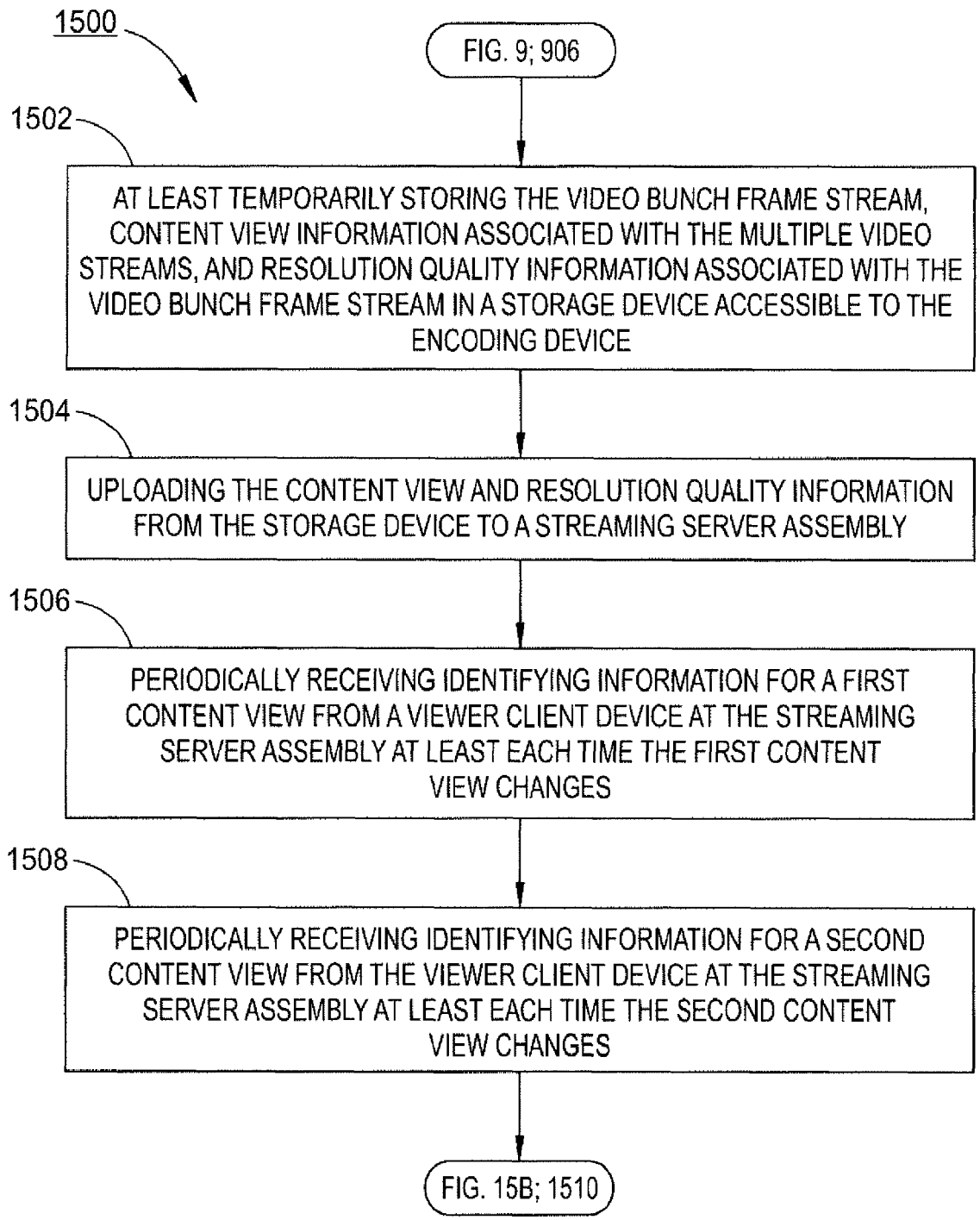
FIGS. 15A and 15B, in combination with FIG. 9, provide a flow chart of yet another exemplary embodiment of a process for morphing multiple video streams into a single video stream.
Figure 15B:
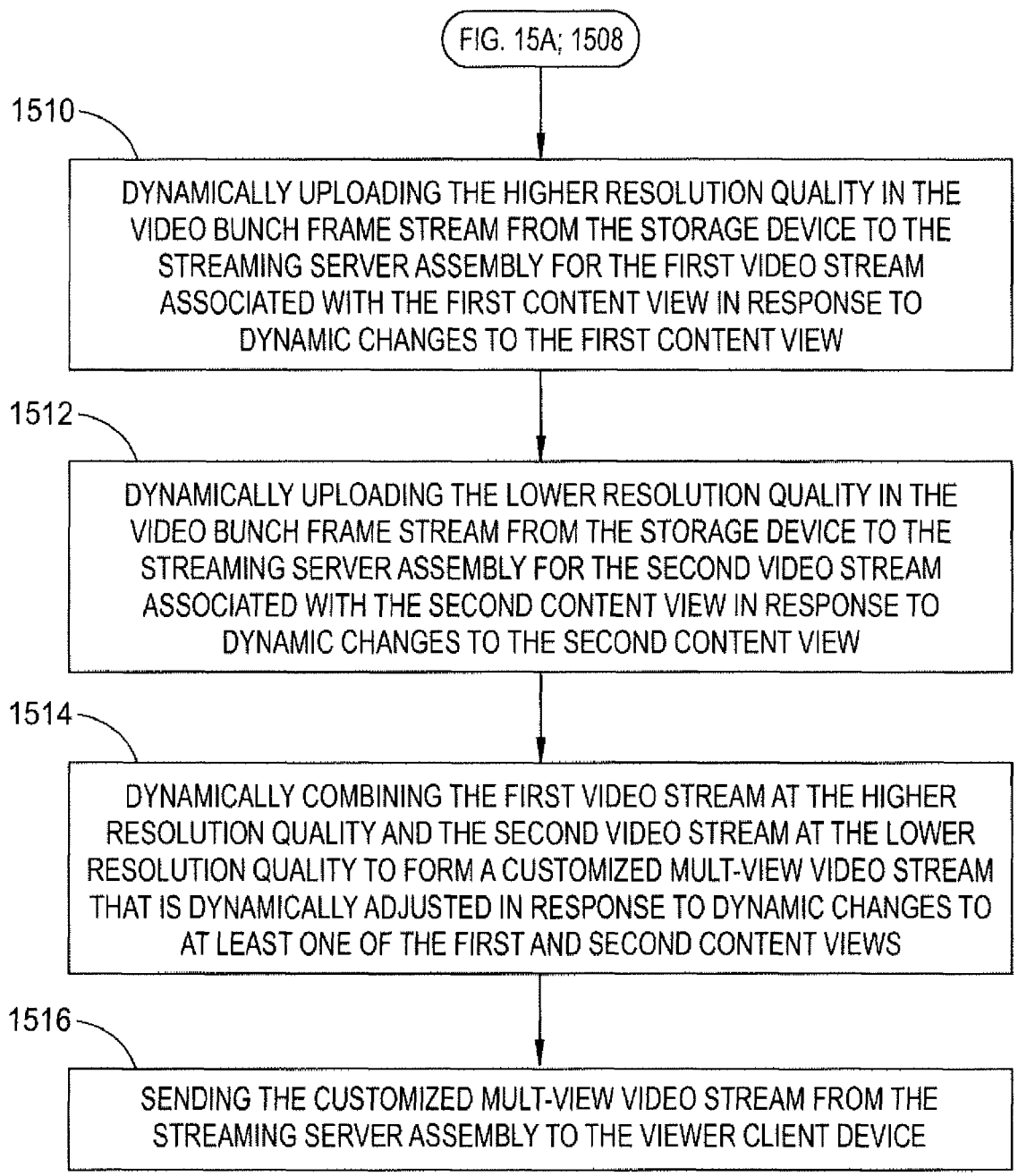

With reference to FIGS. 9, 15A, and 15B, an embodiment of a process 1500 for morphing multiple video streams into a single video stream includes the process 900 of FIG. 9 and continues from 906 to 1502 where the video bunch frame stream, content view information associated with the multiple video streams, and resolution quality information associated with the video bunch frame stream are at least temporarily stored in a storage device accessible to the encoding device. At 1504, the content view and resolution quality information are uploaded from the storage device to a streaming server assembly. Next, identifying information for a first content view is periodically received from a viewer client device at the streaming server assembly at least each time the first content view changes (1506). The viewer client device is configured to permit the first content view to dynamically change in response to user actions at the viewer client device to select which actual content view of the multiple video streams is to be displayed on the viewer client device at a higher resolution quality. The first content view is representative of a corresponding first video stream of the multiple video streams. At 1508, identifying information for a second content view is periodically received from the viewer client device at the streaming server assembly at least each time the second content view changes. The viewer client device is configured to permit the second content view to dynamically change in response to user actions at the viewer client device to select which actual content view of the multiple video streams is to be displayed on the viewer client device at a lower resolution quality. The second content view is different from the first content view and representative of a corresponding second video stream of the multiple video streams. Next, the higher resolution quality in the video bunch frame stream is dynamically uploaded from the storage device to the streaming server assembly for the first video stream associated with the first content view in response to dynamic changes to the first content view (1510). At 1512, the lower resolution quality in the video bunch frame stream is dynamically uploaded from the storage device to the streaming server assembly for the second video stream associated with the second content view in response to dynamic changes to the second content view. Next, the first video stream at the higher resolution quality and the second video stream at the lower resolution quality are dynamically combined to form a customized multi-view video stream that is dynamically adjusted in response to dynamic changes to at least one of the first and second content views (1514). At 1516, the customized multi-view video stream is sent from the streaming server assembly to the viewer client device.

Figure 16:
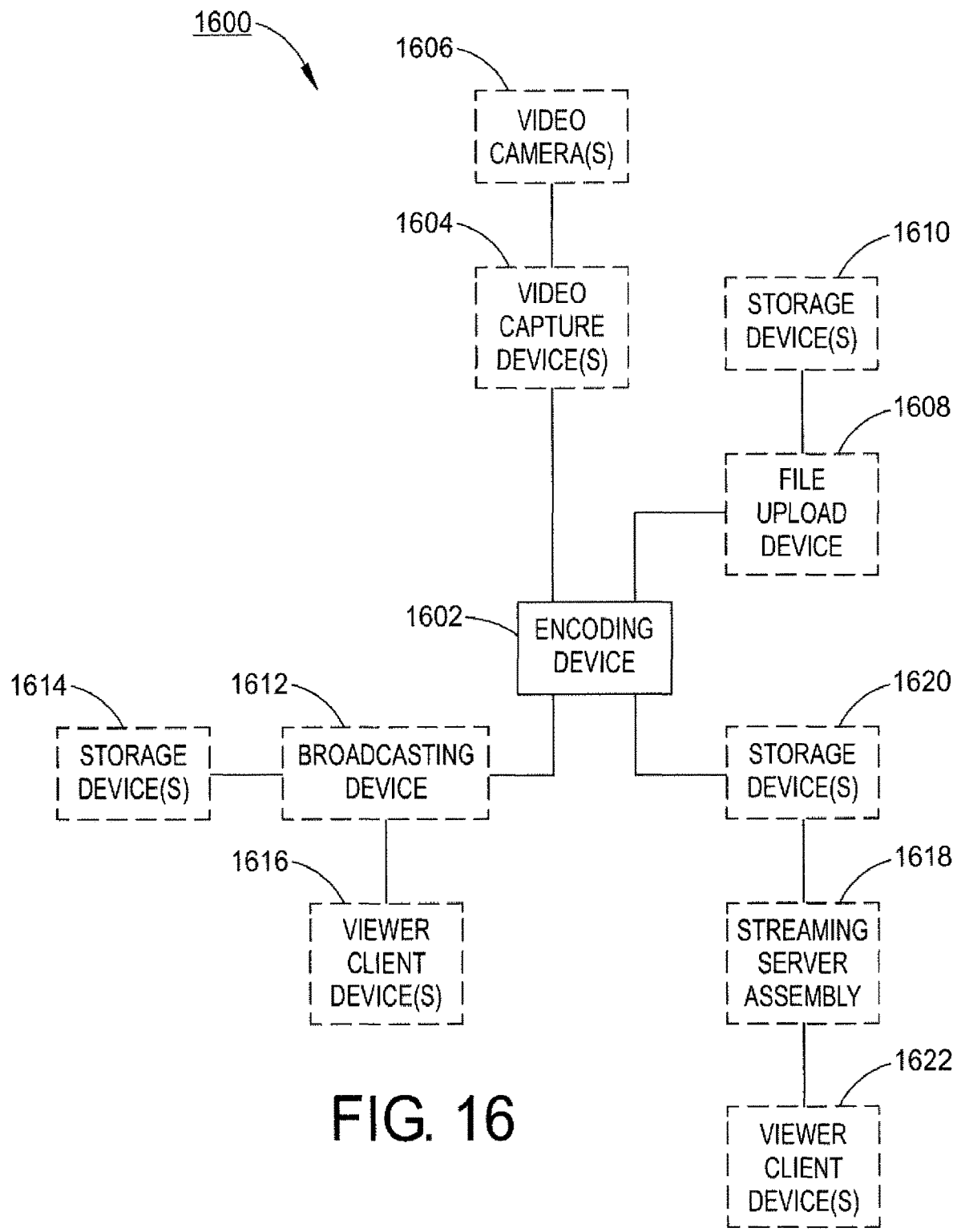
FIG. 16 is a block diagram of an exemplary embodiment of a system configured to morph multiple video streams into a single video stream.

With reference to FIG. 16, a system 1600 for morphing multiple video streams into a single video stream includes an encoding device 1602 configured to receive multiple video streams. Each multiple video stream is formed by a plurality of video frames. The multiple video streams are configured such that each multiple video stream provides a different content view than other streams of the multiple video streams. The encoding device 1602 is configured to encode the plurality of video frames for each multiple video stream at multiple bitrates to form multiple resolution qualities for each multiple video stream. The multiple resolution qualities range from a highest resolution quality to a lowest resolution quality. The encoding device 1602 is configured to combine streams for the multiple resolution qualities of the multiple video streams to form a video bunch frame stream.

In another embodiment, the system 1600 also includes one or more video capture devices 1604 configured to capture multiple video feeds from a plurality of video cameras 1606. The plurality of video cameras 1606 are configured such that each multiple video feed provides a different content view than other feeds of the multiple video feeds. The one or more video capture devices 1604 are configured to send the captured multiple video feeds as the multiple video streams to the encoding device 1602.

In yet another embodiment, the system 1600 also includes a file upload device 1608 configured to upload one or more electronic files associated with multiple video feeds from a storage device 1610. The multiple video feeds are configured such that each multiple video feed provides a different content view than other feeds of the multiple video feeds. The file upload device 1608 is configured to process the one or more electronic files to form the multiple video streams. The file upload device 1608 is configured to send the multiple video streams to the encoding device 1602.

In still another embodiment, the system 1600 also includes a broadcasting device 1612. The encoding device 1602 is configured to send the video bunch frame stream to the broadcasting device 1612. The broadcasting device 1612 is configured to at least temporarily store the video bunch frame stream in a storage device 1614. The broadcasting device 1612 is configured to receive identifying information for a first content view from a first viewer client device 1616. The first content view is representative of a corresponding first video stream of the multiple video streams. The broadcasting device 1612 is configured to receive identifying information for a second content view from the first viewer client device 1616. The second content view is different from the first content view and representative of a corresponding second video stream of the multiple video streams. The broadcasting device 1612 is configured to select a higher resolution quality in the video bunch frame stream for the first video stream associated with the first content view. The broadcasting device 1612 is configured to select a lower resolution quality in the video bunch frame stream for the second video stream associated with the second content view. The broadcasting device 1612 is configured to combine the first video stream at the higher resolution quality and the second video stream at the lower resolution quality to form a first customized multi-view video stream. The broadcasting device 1612 is configured to send the first customized multi-view video stream to the first viewer client device 1616.

In still yet another embodiment, the system 1600 also includes a streaming server assembly 1618. The encoding device 1602 is configured to at least temporarily store the video bunch frame stream, content view information associated with the multiple video streams, and resolution quality information associated with the video bunch frame stream in a storage device 1620. The streaming server assembly 1618 is configured to upload the content view and resolution quality information from the storage device 1620. The streaming server assembly 1618 is configured to receive identifying information for a first content view from a first viewer client device 1622. The first content view is representative of a corresponding first video stream of the multiple video streams. The streaming server assembly 1618 is configured to receive identifying information for a second content view from the first viewer client device 1622. The second content view is different from the first content view and representative of a corresponding second video stream of the multiple video streams. The streaming server assembly 1618 is configured to upload a higher resolution quality in the video bunch frame stream from the storage device 1620 for the first video stream associated with the first content view. The streaming server assembly 1618 is configured to upload a lower resolution quality in the video bunch frame stream from the storage device 1620 for the second video stream associated with the second content view. The streaming server assembly 1618 is configured to combine the first video stream at the higher resolution quality and the second video stream at the lower resolution quality to form a first customized multi-view video stream. The streaming server assembly 1618 is configured to send the first customized multi-view video stream to the first viewer client device 1622.

In another embodiment, the system 1600 also includes a broadcasting device 1612. The encoding device 1602 is configured to send the video bunch frame stream to the broadcasting device 1612. The broadcasting device 1612 is configured to at least temporarily store the video bunch frame stream in a storage device 1614. The broadcasting device 1612 is configured to periodically receive identifying information for a first content view from a viewer client device 1616 at least each time the first content view changes. The viewer client device 1616 is configured to permit the first content view to dynamically change in response to user actions at the viewer client device 1616 to select which actual content view of the multiple video streams is to be displayed on the viewer client device 1616 at a higher resolution quality. The first content view is representative of a corresponding first video stream of the multiple video streams. The broadcasting device 1612 is configured to periodically receive identifying information for a second content view from the viewer client device 1616 at least each time the second content view changes. The viewer client device 1616 is configured to permit the second content view to dynamically change in response to user actions at the viewer client device 1616 to select which actual content view of the multiple video streams is to be displayed on the viewer client device 1616 at a lower resolution quality. The second content view is different from the first content view and representative of a corresponding second video stream of the multiple video streams. The broadcasting device 1612 is configured to dynamically select the higher resolution quality in the video bunch frame stream for the first video stream associated with the first content view in response to dynamic changes to the first content view. The broadcasting device 1612 is configured to dynamically select the lower resolution quality in the video bunch frame stream for the second video stream associated with the second content view in response to dynamic changes to the second content view. The broadcasting device 1612 is configured to dynamically combine the first video stream at the higher resolution quality and the second video stream at the lower resolution quality to form a customized multi-view video stream that is dynamically adjusted in response to dynamic changes to at least one of the first and second content views. The broadcasting device 1612 is configured to send the customized multi-view video stream to the viewer client device 1616.

In yet another embodiment, the system 1600 also includes a streaming server assembly 1618. The encoding device 1602 is configured to at least temporarily store the video bunch frame stream, content view information associated with the multiple video streams, and resolution quality information associated with the video bunch frame stream in a storage device 1620. The streaming server assembly 1618 is configured to upload the content view and resolution quality information from the storage device 1620. The streaming server assembly 1618 is configured to periodically receive identifying information for a first content view from a viewer client device 1622 at least each time the first content view changes. The viewer client device 1622 is configured to permit the first content view to dynamically change in response to user actions at the viewer client device 1622 to select which actual content view of the multiple video streams is to be displayed on the viewer client device 1622 at a higher resolution quality. The first content view is representative of a corresponding first video stream of the multiple video streams. The streaming server assembly 1618 is configured to periodically receive identifying information for a second content view from the viewer client device 1622 at least each time the second content view changes. The viewer client device 1622 is configured to permit the second content view to dynamically change in response to user actions at the viewer client device 1622 to select which actual content view of the multiple video streams is to be displayed on the viewer client device 1622 at a lower resolution quality. The second content view is different from the first content view and representative of a corresponding second video stream of the multiple video streams. The streaming server assembly 1618 is configured to dynamically upload the higher resolution quality in the video bunch frame stream from the storage device 1620 for the first video stream associated with the first content view in response to dynamic changes to the first content view. The streaming server assembly 1618 is configured to dynamically upload the lower resolution quality in the video bunch frame stream from the storage device 1620 for the second video stream associated with the second content view in response to dynamic changes to the second content view. The streaming server assembly 1618 is configured to dynamically combine the first video stream at the higher resolution quality and the second video stream at the lower resolution quality to form a customized multi-view video stream that is dynamically adjusted in response to dynamic changes to at least one of the first and second content views. The streaming server assembly 1618 is configured to send the customized multi-view video stream to the viewer client device 1622.

With reference to FIGS. 9-16, various exemplary embodiments of non-transitory computer-readable medium storing program instructions that, when executed by at least one computer or processor cause a corresponding processor-controlled system (e.g., system 1600) to perform a method of morphing multiple video streams into a single video stream. For example, various embodiments of the processor-controlled system are described above with reference to FIG. 16. Various embodiments of the method of morphing multiple video streams into a single video stream are described above with reference to FIGS. 9-12, 13A, 13B, 14A, 14B, 15A, and 15B. In other words, the program instructions of the various exemplary embodiments of non-transitory computer-readable medium are defined by any suitable combination of the processes 900, 1000, 1100, 1200, 1300, 1400, and 1500 described above with reference to FIGS. 9-12, 13A, 13B, 14A, 14B, 15A, and 15B. Similarly, the processor-controlled system 1600 associated with the various exemplary embodiments of non-transitory computer-readable medium are defined by any suitable combination of components described above with reference to FIG. 16.

Numerous additional variations on the various embodiments of methods, processes, and systems described above will be apparent to those skilled in the art in view of the above description. Such variations include presently unforeseen or unanticipated alternatives, modifications, and improvements that may be subsequently made by those skilled in the art and are intended to be within the scope of the methods, processes, and systems described herein.

We claim:

1. A method of morphing multiple video streams into a single video stream, comprising:
receiving multiple video streams at an encoding device, wherein each multiple video stream is formed by a plurality of video frames, wherein the multiple video streams are configured such that each multiple video stream provides a different content view than other streams of the multiple video streams;
at the encoding device, encoding the plurality of video frames for each multiple video stream at multiple bitrates to form multiple bitrate encodings corresponding to multiple resolution qualities for each multiple video stream, wherein the multiple resolution qualities range from a highest resolution quality to a lowest resolution quality;
at the encoding device, combining the multiple bitrate encodings for the multiple video streams to form a video bunch frame stream, wherein the video bunch frame stream includes the multiple bitrate encodings for each multiple video stream based on the combining;
combining a higher resolution quality of a first video stream of the multiple video streams from the bunch frame stream and a lower resolution quality of a second video stream of the multiple video streams from the bunch frame stream to form a customized multi-view video stream, wherein the first video stream is associated with a first content view and selected in response to first identifying information received from a viewer client device, wherein the second video stream is associated with a second content view and selected in response to second identifying information received from the viewer client device, wherein the first identifying information is associated with the first content view and the second identifying information is associated with the second content view; and
sending the customized multi-view video stream to the viewer client device.

2. The method of claim 1, further comprising:
capturing multiple video feeds from a plurality of video cameras at one or more video capture devices, wherein the plurality of video cameras are configured such that each multiple video feed provides a different content view than other feeds of the multiple video feeds; and
sending the captured multiple video feeds as the multiple video streams from the one or more video capture devices to the encoding device.

3. The method of claim 1, further comprising:
uploading one or more electronic files associated with multiple video feeds from a storage device to a file upload device, wherein the multiple video feeds are configured such that each multiple video feed provides a different content view than other feeds of the multiple video feeds;
processing the one or more electronic files to form the multiple video streams; and
sending the multiple video streams from the file upload device to the encoding device.

4. The method of claim 1, further comprising:
sending the video bunch frame stream from the encoding device to a broadcasting device;
at least temporarily storing the video bunch frame stream in a storage device accessible to the broadcasting device;
receiving the first identifying information for the first content view from the viewer client device at the broadcasting device, wherein the first content view is representative of the first video stream;
receiving the second identifying information for the second content view from the viewer client device at the broadcasting device, wherein the second content view is different from the first content view and representative of the second video stream;
selecting the higher resolution quality in the video bunch frame stream for the first video stream associated with the first content view;
selecting the lower resolution quality in the video bunch frame stream for the second video stream associated with the second content view;
at the broadcasting device, combining the first video stream at the higher resolution quality and the second video stream at the lower resolution quality to form the customized multi-view video stream; and
sending the customized multi-view video stream from the broadcasting device to the viewer client device.

5. The method of claim 4, further comprising:
receiving identifying information for a first preferred content view from a second viewer client device at the broadcasting device, wherein the first preferred content view is different from the first content view selected by the viewer client device and representative of a corresponding first preferred video stream of the multiple video streams;
receiving identifying information for a second preferred content view from the second viewer client device at the broadcasting device, wherein the second preferred content view is different from the first preferred content view and representative of a corresponding second preferred video stream of the multiple video streams;
selecting a higher resolution quality in the video bunch frame stream for the first preferred video stream associated with the first preferred content view;
selecting a lower resolution quality in the video bunch frame stream for the second preferred video stream associated with the second preferred content view;
combining the first preferred video stream at the higher resolution quality and the second preferred video stream at the lower resolution quality to form a second customized multi-view video stream; and sending the second customized multi-view video stream from the broadcasting device to the second viewer client device.

6. The method of claim 1, further comprising:

at least temporarily storing the video bunch frame stream, content view information associated with the multiple video streams, and resolution quality information associated with the video bunch frame stream in a storage device accessible to the encoding device;

uploading the content view and resolution quality information from the storage device to a streaming server assembly;

receiving the first identifying information for the first content view from the viewer client device at the streaming server assembly, wherein the first content view is representative of the first video stream;

receiving the second identifying information for the second content view from the viewer client device at the streaming server assembly, wherein the second content view is different from the first content view and representative of the second video stream;

uploading the higher resolution quality in the video bunch frame stream from the storage device to the streaming server assembly for the first video stream associated with the first content view;

uploading the lower resolution quality in the video bunch frame stream from the storage device to the streaming server assembly for the second video stream associated with the second content view;

at the streaming server assembly, combining the first video stream at the higher resolution quality and the second video stream at the lower resolution quality to form the customized multi-view video stream; and sending the customized multi-view video stream from the streaming server assembly to the viewer client device.

7. The method of claim 6, further comprising:

receiving identifying information for a first preferred content view from a second viewer client device at the streaming server assembly, wherein the first preferred content view is different from the first content view selected by the viewer client device and representative of a corresponding first preferred video stream of the multiple video streams;

receiving identifying information for a second preferred content view from the second viewer client device at the streaming server assembly, wherein the second preferred content view is different from the first preferred content view and representative of a corresponding second preferred video stream of the multiple video streams;

uploading a higher resolution quality in the video bunch frame stream from the storage device to the streaming server assembly for the first preferred video stream associated with the first preferred content view;

uploading a lower resolution quality in the video bunch frame stream from the storage device to the streaming server assembly for the second preferred video stream associated with the second preferred content view;

combining the first preferred video stream at the higher resolution quality and the second preferred video stream at the lower resolution quality to form a second customized multi-view video stream; and sending the second customized multi-view video stream from the streaming server assembly to the second viewer client device.

8. The method of claim 1, further comprising:

sending the video bunch frame stream from the encoding device to a broadcasting device;

at least temporarily storing the video bunch frame stream in a storage device accessible to the broadcasting device;

periodically receiving the first identifying information for the first content view from the viewer client device at the broadcasting device at least each time the first content view changes, wherein the viewer client device is configured to permit the first content view to dynamically change in response to user actions at the viewer client device to select which actual content view of the multiple video streams is to be displayed on the viewer client device at the higher resolution quality, wherein the first content view is representative of the first video stream;

periodically receiving the second identifying information for the second content view from the viewer client device at the broadcasting device at least each time the second content view changes, wherein the viewer client device is configured to permit the second content view to dynamically change in response to user actions at the viewer client device to select which actual content view of the multiple video streams is to be displayed on the viewer client device at the lower resolution quality, wherein the second content view is different from the first content view and representative of the second video stream;

dynamically selecting the higher resolution quality in the video bunch frame stream for the first video stream associated with the first content view in response to dynamic changes to the first content view;

dynamically selecting the lower resolution quality in the video bunch frame stream for the second video stream associated with the second content view in response to dynamic changes to the second content view;

at the broadcasting device, dynamically combining the first video stream at the higher resolution quality and the second video stream at the lower resolution quality to form the customized multi-view video stream that is dynamically adjusted in response to dynamic changes to at least one of the first and second content views; and sending the customized multi-view video stream from the broadcasting device to the viewer client device.

9. The method of claim 1, further comprising:

at least temporarily storing the video bunch frame stream, content view information associated with the multiple video streams, and resolution quality information associated with the video bunch frame stream in a storage device accessible to the encoding device;

uploading the content view and resolution quality information from the storage device to a streaming server assembly;

periodically receiving the first identifying information for the first content view from the viewer client device at the streaming server assembly at least each time the first content view changes, wherein the viewer client device is configured to permit the first content view to dynamically change in response to user actions at the viewer client device to select which actual content view of the multiple video streams is to be displayed on the viewer client device at the higher resolution quality, wherein the first content view is representative of the first video stream;

periodically receiving the second identifying information for the second content view from the viewer client device at the streaming server assembly at least each time the second content view changes, wherein the viewer client device is configured to permit the second content view to dynamically change in response to user actions at the viewer client device to select which actual content view of the multiple video streams is to be displayed on the viewer client device at the lower resolution quality, wherein the second content view is different from the first content view and representative of the second video stream;

dynamically uploading the higher resolution quality in the video bunch frame stream from the storage device to the streaming server assembly for the first video stream associated with the first content view in response to dynamic changes to the first content view;

dynamically uploading the lower resolution quality in the video bunch frame stream from the storage device to the streaming server assembly for the second video stream associated with the second content view in response to dynamic changes to the second content view;

at the streaming server assembly, dynamically combining the first video stream at the higher resolution quality and the second video stream at the lower resolution quality to form the customized multi-view video stream that is dynamically adjusted in response to dynamic changes to at least one of the first and second content views; and sending the customized multi-view video stream from the streaming server assembly to the viewer client device.

10. The method of claim 1 wherein the different content views of the multiple video streams provide scenes of an event from different viewing points.

11. The method of claim 1 wherein the different content views of the multiple video streams provide scenes of different events.

12. The method of claim 1 wherein each multiple video stream is defined by a predetermined configuration such that the predetermined configuration is consistent from frame-to-frame;
wherein the predetermined configuration for each multiple video stream includes shape and size parameters for the corresponding content view in a manner that permits different multiple video streams to have different shapes and different sizes.

13. The method of claim 1 wherein the multiple bitrates for each multiple video stream include at least three bitrates such that the multiple resolution qualities for each multiple video stream include a high resolution quality, at least one intermediate resolution quality, and a low resolution quality.

14. An apparatus for morphing multiple video streams into a single video stream, comprising:
an encoding device configured to receive multiple video streams, wherein each multiple video stream is formed by a plurality of video frames, wherein the multiple video streams are configured such that each multiple video stream provides a different content view than other streams of the multiple video streams, wherein the encoding device is configured to encode the plurality of video frames for each multiple video stream at multiple bitrates to form multiple bitrate encodings corresponding to multiple resolution qualities for each multiple video stream, wherein the multiple resolution qualities range from a highest resolution quality to a lowest resolution quality, wherein the encoding device is configured to combine the multiple bitrate encodings for the multiple video streams to form a video bunch frame stream, wherein the video bunch frame stream includes the multiple bitrate encodings for each multiple video stream based on the combining; and a streaming server assembly configured to access the video bunch frame stream and configured to obtain a higher resolution quality of a first video stream of the multiple video streams from the bunch frame stream and a lower resolution quality of a second video stream of the multiple video streams from the bunch frame stream, wherein the first video stream is associated with a first content view and selected in response to first identifying information received from a viewer client device, wherein the second video stream is associated with a second content view and selected in response to second identifying information received from the viewer client device, wherein the first identifying information is associated with the first content view and the second identifying information is associated with the second content view, wherein the streaming server assembly is configured to combine the higher resolution quality of the first video stream and the lower resolution quality of the second video stream to form a customized multi-view video stream, wherein the streaming server assembly is configured to send the customized multi-view video stream to the viewer client device.

15. The apparatus of claim 14, further comprising:
one or more video capture devices configured to capture multiple video feeds from a plurality of video cameras, wherein the plurality of video cameras are configured such that each multiple video feed provides a different content view than other feeds of the multiple video feeds;
wherein the one or more video capture devices are configured to send the captured multiple video feeds as the multiple video streams to the encoding device.

16. The apparatus of claim 14, further comprising:
a file upload device configured to upload one or more electronic files associated with multiple video feeds from a storage device, wherein the multiple video feeds are configured such that each multiple video feed provides a different content view than other feeds of the multiple video feeds;
wherein the file upload device is configured to process the one or more electronic files to form the multiple video streams;
wherein the file upload device is configured to send the multiple video streams to the encoding device.

17. The apparatus of claim 14, further comprising:
a broadcasting device;
wherein the encoding device is configured to send the video bunch frame stream to the broadcasting device;
wherein the broadcasting device is configured to at least temporarily store the video bunch frame stream in a storage device;
wherein the broadcasting device is configured to receive the first identifying information for the first content view from the viewer client device, wherein the first content view is representative of the first video stream;
wherein the broadcasting device is configured to receive the second identifying information for the second content view from the viewer client device, wherein the second content view is different from the first content view and representative of the second video stream;

wherein the broadcasting device is configured to select the higher resolution quality in the video bunch frame stream for the first video stream associated with the first content view;

wherein the broadcasting device is configured to select the lower resolution quality in the video bunch frame stream for the second video stream associated with the second content view;

wherein the broadcasting device is configured to combine the first video stream at the higher resolution quality and the second video stream at the lower resolution quality to form the customized multi-view video stream;

wherein the broadcasting device is configured to send the customized multi-view video stream to the viewer client device.

18. The apparatus of claim 14, wherein the encoding device is configured to at least temporarily store the video bunch frame stream, content view information associated with the multiple video streams, and resolution quality information associated with the video bunch frame stream in a storage device;

wherein the streaming server assembly is configured to upload the content view and resolution quality information from the storage device;

wherein the streaming server assembly is configured to receive the first identifying information for the first content view from the viewer client device, wherein the first content view is representative of the first video stream;

wherein the streaming server assembly is configured to receive the second identifying information for the second content view from the viewer client device, wherein the second content view is different from the first content view and representative of the second video stream;

wherein the streaming server assembly is configured to upload the higher resolution quality in the video bunch frame stream from the storage device for the first video stream associated with the first content view;

wherein the streaming server assembly is configured to upload the lower resolution quality in the video bunch frame stream from the storage device for the second video stream associated with the second content view.

19. The apparatus of claim 14, further comprising: a broadcasting device;

wherein the encoding device is configured to send the video bunch frame stream to the broadcasting device;

wherein the broadcasting device is configured to at least temporarily store the video bunch frame stream in a storage device;

wherein the broadcasting device is configured to periodically receive the first identifying information for the first content view from the viewer client device at least each time the first content view changes, wherein the viewer client device is configured to permit the first content view to dynamically change in response to user actions at the viewer client device to select which actual content view of the multiple video streams is to be displayed on the viewer client device at the higher resolution quality, wherein the first content view is representative of the first video stream;

wherein the broadcasting device is configured to periodically receive the second identifying information for the second content view from the viewer client device at least each time the second content view changes, wherein the viewer client device is configured to permit the second content view to dynamically change in response to user actions at the viewer client device to select which actual content view of the multiple video streams is to be displayed on the viewer client device at the lower resolution quality, wherein the second content view is different from the first content view and representative of the second video stream;

wherein the broadcasting device is configured to dynamically select the higher resolution quality in the video bunch frame stream for the first video stream associated with the first content view in response to dynamic changes to the first content view;

wherein the broadcasting device is configured to dynamically select the lower resolution quality in the video bunch frame stream for the second video stream associated with the second content view in response to dynamic changes to the second content view;

wherein the broadcasting device is configured to dynamically combine the first video stream at the higher resolution quality and the second video stream at the lower resolution quality to form the customized multi-view video stream that is dynamically adjusted in response to dynamic changes to at least one of the first and second content views;

wherein the broadcasting device is configured to send the customized multi-view video stream to the viewer client device.

20. The apparatus of claim 14, wherein the encoding device is configured to at least temporarily store the video bunch frame stream, content view information associated with the multiple video streams, and resolution quality information associated with the video bunch frame stream in a storage device;

wherein the streaming server assembly is configured to upload the content view and resolution quality information from the storage device;

wherein the streaming server assembly is configured to periodically receive the first identifying information for the first content view from the viewer client device at least each time the first content view changes, wherein the viewer client device is configured to permit the first content view to dynamically change in response to user actions at the viewer client device to select which actual content view of the multiple video streams is to be displayed on the viewer client device at the higher resolution quality, wherein the first content view is representative of the first video stream;

wherein the streaming server assembly is configured to periodically receive the second identifying information for the second content view from the viewer client device at least each time the second content view changes, wherein the viewer client device is configured to permit the second content view to dynamically change in response to user actions at the viewer client device to select which actual content view of the multiple video streams is to be displayed on the viewer client device at the lower resolution quality, wherein the second content view is different from the first content view and representative of the second video stream;

wherein the streaming server assembly is configured to dynamically upload the higher resolution quality in the video bunch frame stream from the storage device for the first video stream associated with the first content view in response to dynamic changes to the first content view;

wherein the streaming server assembly is configured to dynamically upload the lower resolution quality in the video bunch frame stream from the storage device for the second video stream associated with the second content view in response to dynamic changes to the second content view;

wherein the streaming server assembly is configured to dynamically combine the first video stream at the higher resolution quality and the second video stream at the lower resolution quality to form the customized multi-view video stream that is dynamically adjusted in response to dynamic changes to at least one of the first and second content views;

wherein the streaming server assembly is configured to send the customized multi-view video stream to the viewer client device.

21. A non-transitory computer-readable medium storing program instructions that, when executed by at least one computer or processor, cause a computer-controlled system to perform a method of morphing multiple video streams into a single video stream, the method comprising:

receiving multiple video streams at an encoding device, wherein each multiple video stream is formed by a plurality of video frames, wherein the multiple video streams are configured such that each multiple video stream provides a different content view than other streams of the multiple video streams;

at the encoding device, encoding the plurality of video frames for each multiple video stream at multiple bitrates to form multiple bitrate encodings corresponding to multiple resolution qualities for each multiple video stream, wherein the multiple resolution qualities range from a highest resolution quality to a lowest resolution quality;

at the encoding device, combining the multiple bitrate encodings for the multiple video streams to form a video bunch frame stream, wherein the video bunch frame stream includes the multiple bitrate encodings for each multiple video stream based on the combining;

combining a higher resolution quality of a first video stream of the multiple video streams from the bunch frame stream and a lower resolution quality of a second video stream of the multiple video streams from the bunch frame stream to form a customized multi-view video stream, wherein the first video stream is associated with a first content view and selected in response to first identifying information received from a viewer client device, wherein the second video stream is associated with a second content view and selected in response to second identifying information received from the viewer client device, wherein the first identifying information is associated with the first content view and the second identifying information is associated with the second content view; and sending the customized multi-view video stream to the viewer client device.

\* \* \* \* \*